US007843941B2

(12) United States Patent
Kawamura

(10) Patent No.: US 7,843,941 B2
(45) Date of Patent: Nov. 30, 2010

(54) COMMUNICATION SYSTEM, SERVER, COMMUNICATION TERMINAL AND COMMUNICATION METHOD

(75) Inventor: Seigo Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 12/002,712

(22) Filed: Dec. 18, 2007

(65) Prior Publication Data
US 2008/0151749 A1 Jun. 26, 2008

(30) Foreign Application Priority Data
Dec. 21, 2006 (JP) ............................. 2006-344576

(51) Int. Cl.
H04L 12/28 (2006.01)
G06F 15/16 (2006.01)
(52) U.S. Cl. .................. 370/395.4; 709/219; 455/404.1
(58) Field of Classification Search ........................ None
See application file for complete search history.

(56) References Cited

U.S. PATENT DOCUMENTS

| 5,272,697 | A  | * | 12/1993 | Fraser et al. ................. 370/235 |
| 6,934,735 | B1 | * | 8/2005  | Emens et al. ................ 709/203 |
| 7,007,116 | B2 | * | 2/2006  | Odakura et al. ............. 370/232 |
| 7,536,477 | B2 | * | 5/2009  | Ramasubramanian et al. .... 370/224 |
| 2001/0037372 | A1 | * | 11/2001 | Tachi et al. .................. 709/217 |
| 2001/0043613 | A1 | * | 11/2001 | Wibowo et al. ............. 370/468 |
| 2003/0016647 | A1 | * | 1/2003  | Margon ....................... 370/342 |
| 2003/0114156 | A1 | * | 6/2003  | Kinnavy ...................... 455/434 |
| 2004/0172476 | A1 | * | 9/2004  | Chapweske .................. 709/231 |
| 2005/0157853 | A1 | * | 7/2005  | Andrew ....................... 370/337 |
| 2005/0175027 | A1 | * | 8/2005  | Miller et al. ................. 370/458 |
| 2005/0286422 | A1 | * | 12/2005 | Funato ........................ 370/235 |
| 2006/0265524 | A1 | * | 11/2006 | Fricke et al. .................. 710/33 |
| 2007/0070936 | A1 | * | 3/2007  | Stamoulis et al. ........... 370/328 |
| 2007/0157292 | A1 | * | 7/2007  | Danner et al. ............... 709/225 |
| 2009/0116388 | A1 | * | 5/2009  | Adachi et al. ............... 370/235 |

FOREIGN PATENT DOCUMENTS

JP     2006-113698 A     4/2006

* cited by examiner

Primary Examiner—Gregory B Sefcheck
Assistant Examiner—Joshua Smith
(74) Attorney, Agent, or Firm—Wolf, Greenfield & Sacks, P.C.

(57) ABSTRACT

A communication system includes: communication terminals; and a server that can connect to and communicate with the communication terminals, wherein: the server including: a first communication section that communicates with the communication terminals; a storage section that stores a plurality of connection patterns each of which indicates timings at which the communication terminal will access the server; a pattern selection section that selects one of the connection patterns from the storage section; and a first control section that controls the first communication section to transmit the connection pattern selected by the pattern selection section to the communication terminal the first communication section connects to; and the communication terminal including: a second communication section that communicates with the server; and a second control section that controls the second communication section to connect to the server at timing indicated in the connection pattern received by the second communication section.

18 Claims, 18 Drawing Sheets

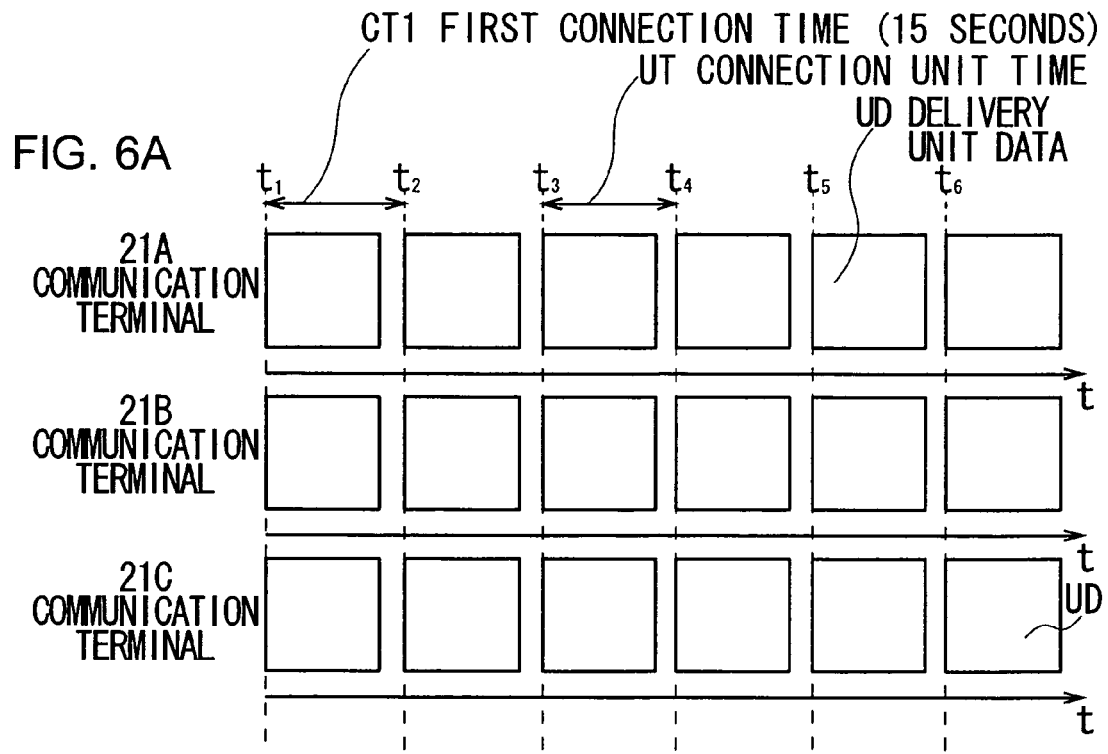
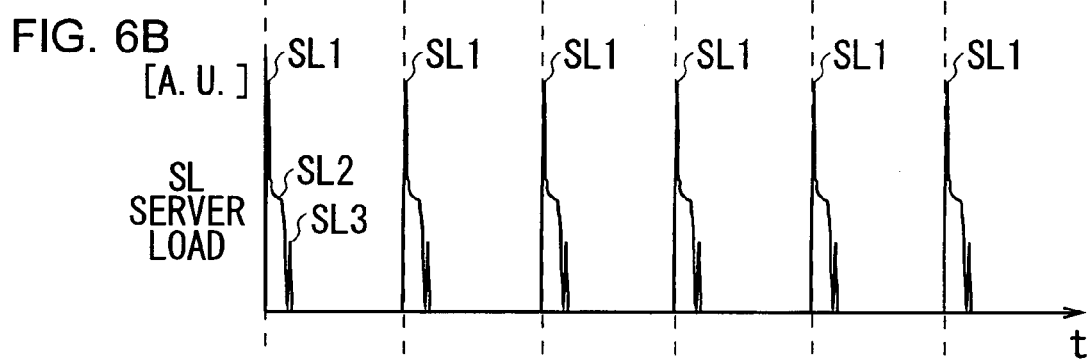
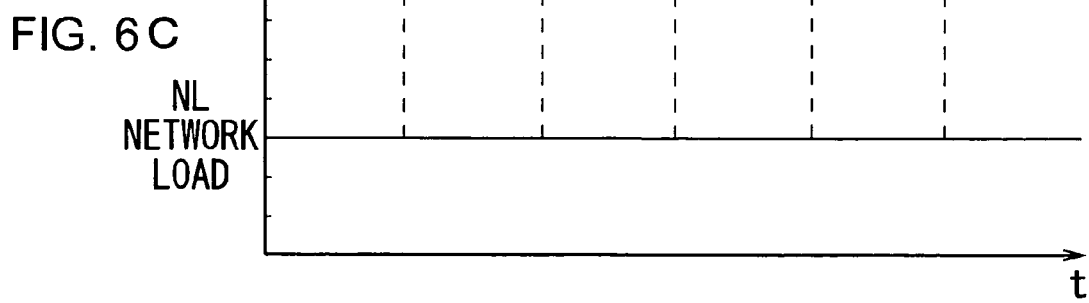

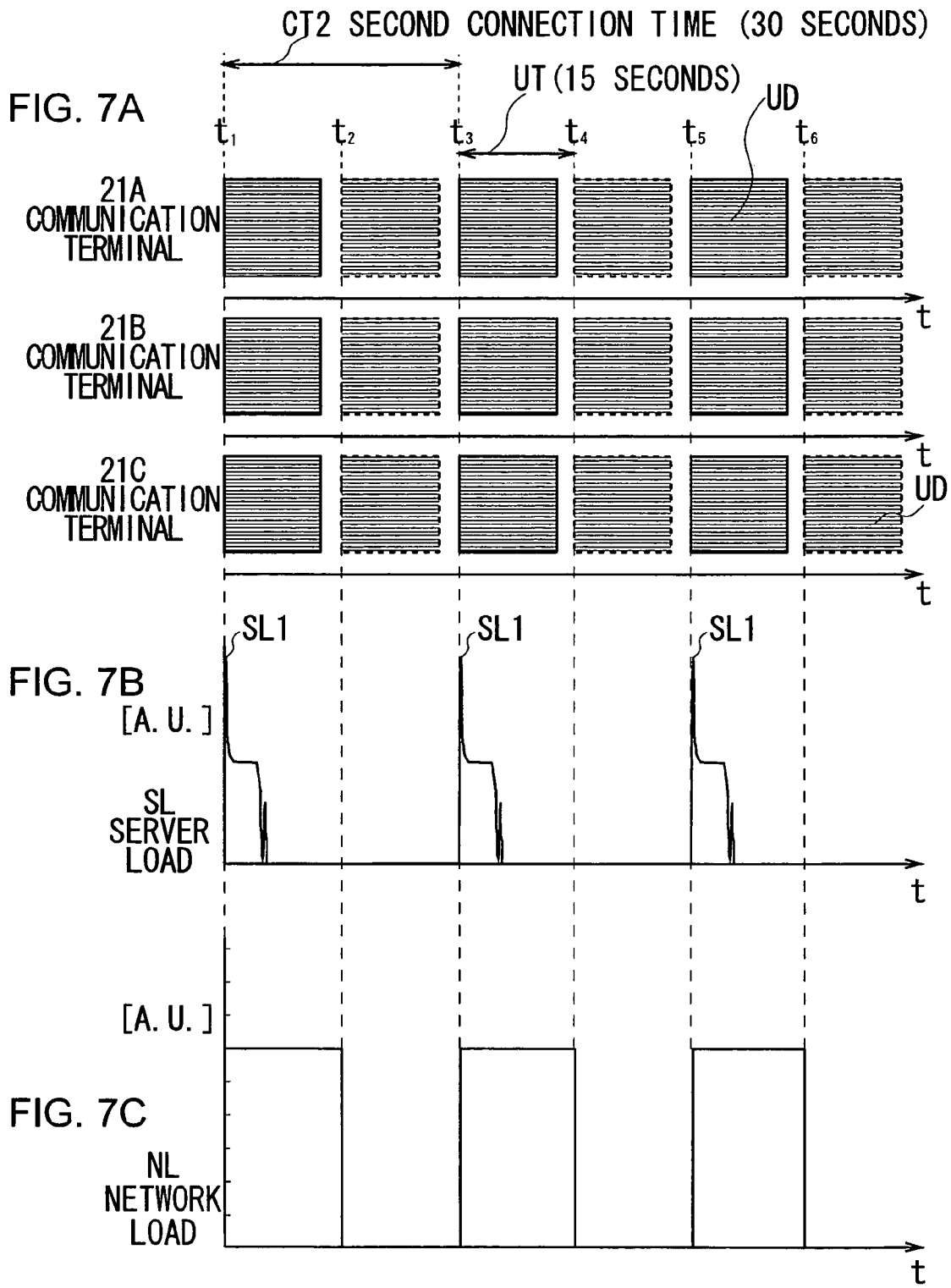

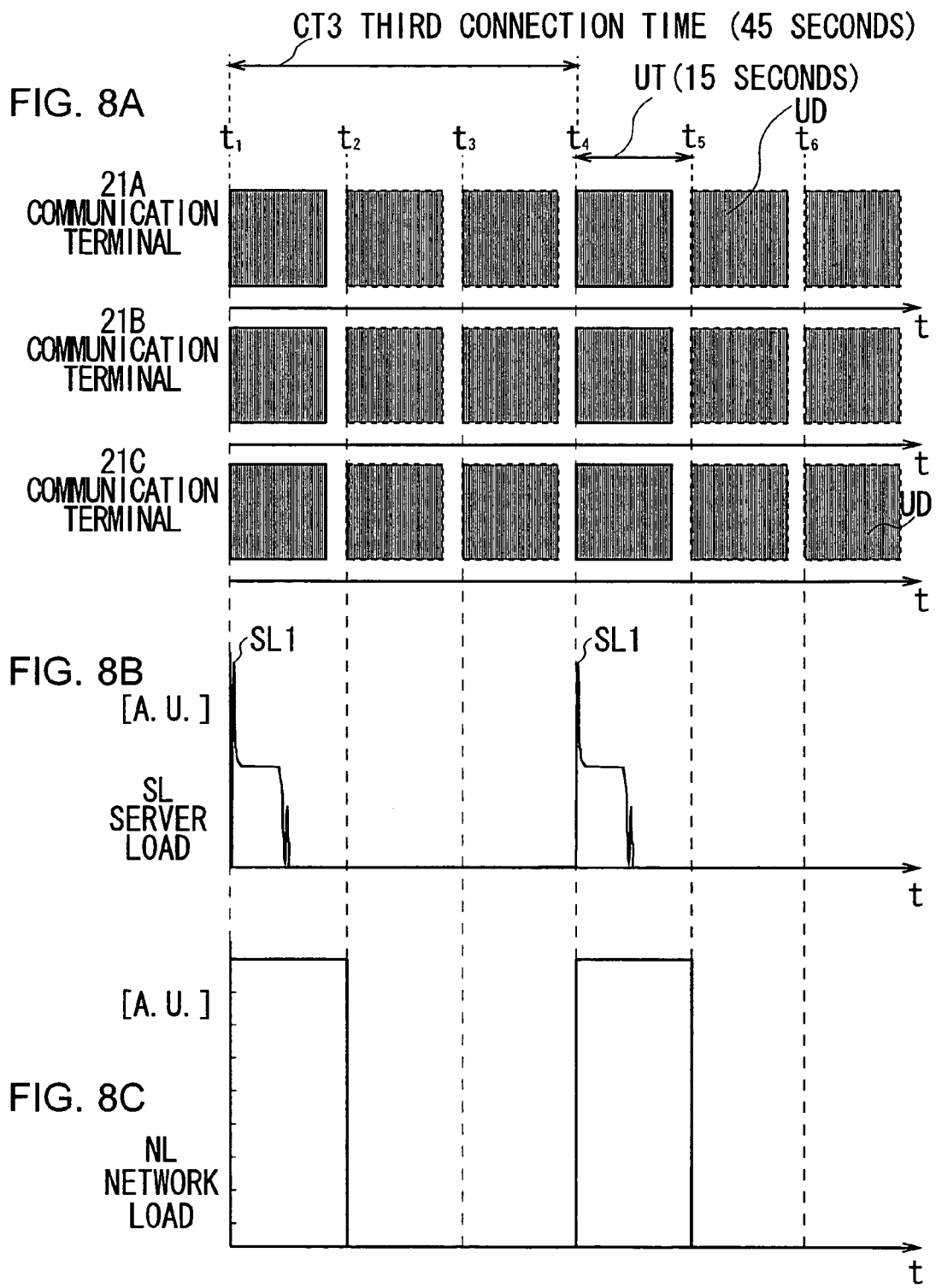

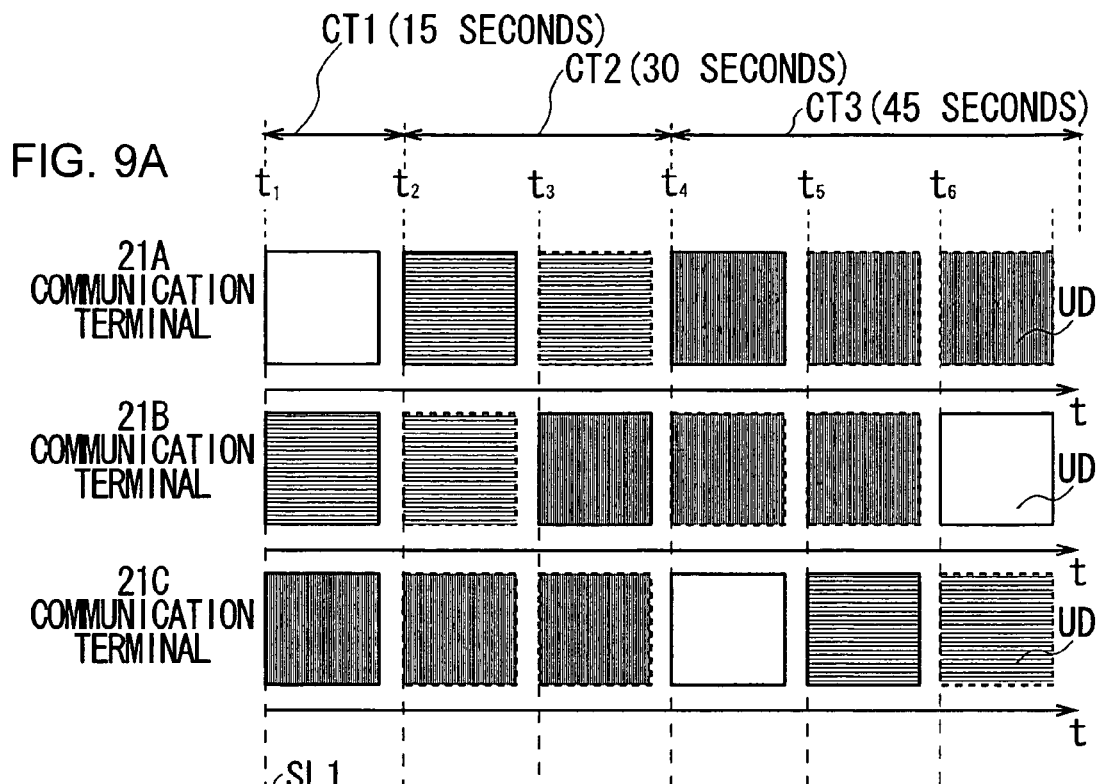

| CHARACTERISTIC | FIRST CASE | | SECOND CASE | | THIRD CASE | | FIRST EMBODIMENT | |
|---|---|---|---|---|---|---|---|---|
| THE AVERAGE OF THE AMOUNT OF DATA ACQUIRED | 1 TIME/ CONNECTION | △ 0 POINT | 2 TIMES/ CONNECTION | ○ 1 POINT | 3 TIMES/ CONNECTION | △ 0 POINT | 2 TIMES/ CONNECTION | ○ 1 POINT |
| THE SHORTEST CONNECTION TIME | CONNECTION UNIT TIME UT ×1 (15 SECONDS) | ◎ 2 POINTS | CONNECTION UNIT TIME UT ×2 (30 SECONDS) | ○ 1 POINT | CONNECTION UNIT TIME UT ×3 (45 SECONDS) | △ 0 POINT | CONNECTION UNIT TIME UT ×1 (15 SECONDS) | ◎ 2 POINTS |
| THE LONGEST CONNECTION TIME | CONNECTION UNIT TIME UT ×1 (15 SECONDS) | ◎ 2 POINTS | CONNECTION UNIT TIME UT ×2 (30 SECONDS) | ○ 1 POINT | CONNECTION UNIT TIME UT ×3 (45 SECONDS) | △ 0 POINT | CONNECTION UNIT TIME UT ×3 (45 SECONDS) | △ 0 POINT |
| THE AVERAGE OF THE NUMBER OF TERMINALS CONNECTED AT THE SAME TIME | COMMUNICATION TERMINAL ×3 | △ 0 POINT | COMMUNICATION TERMINAL ×1.5 | ○ 1 POINT | COMMUNICATION TERMINAL ×1 | ◎ 2 POINTS | COMMUNICATION TERMINAL ×1.5 | ○ 1 POINT |
| THE NUMBER OF TIMES WHEN THE SERVER LOAD OCCURS | SIX TIMES | × −1 POINT | THREE TIMES | △ 0 POINT | TWICE | ○ 1 POINT | ONE TIME | ◎ 2 POINTS |
| TOTAL POINT | | 3 POINTS | | 4 POINTS | | 3 POINTS | | 6 POINTS |

FIG. 10

COMMUNICATION SYSTEM, SERVER, COMMUNICATION TERMINAL AND COMMUNICATION METHOD

CROSS REFERENCES TO RELATED APPLICATIONS

The present invention contains subject matter related to Japanese Patent Application JP2006-344576 filed in the Japanese Patent Office on Dec. 21, 2006, the entire contents of which being incorporated herein by reference.

BACKGROUND OF THE INVENTION

1. Field of the Invention

The present invention relates to a communication system, server, communication terminal and communication method, and is preferably applied to a communication system in which a server communicates with a plurality of communication terminals.

2. Description of the Related Art

There is a communication system in which a server communicates with a plurality of communication terminals. In this kind of system, a server is designed to check processing load regarding a communication process with each communication terminal. Based on the result of checking, the server transmits to the communication terminals information (also referred to as "time-period information") indicating how long a communication terminal will wait until it access the server again. The communication terminal receives from the server the time-period information and then randomly calculates (or determines) a certain period of time within the period represented by the time-period information. The communication terminal is designed to connect to the server after the calculated period has passed. This prevents a lot of communication terminals from accessing the server at the same time, reducing the processing load of the server (see Jpn. Pat. Laid-open Publication No. 2006-113698).

SUMMARY OF THE INVENTION

In that manner, that can reduce the processing load of the server. However, the server needs to keep checking the processing load regarding a communication process with each communication terminal. At the same time, the communication terminals needs to randomly calculate (or determine) a certain period of time within the period represented by the time-period information. That increases the processing load of the server and the communication terminals.

The present invention has been made in view of the above points and is intended to provide a communication system, server, communication terminal and communication method that can reduce the processing load regarding communication.

In one aspect of the present invention, a communication system includes: a plurality of communication terminals; and a server that can connect to and communicate with the communication terminals, wherein: the server including: a first communication section that connects to and communicates with the communication terminals; a storage section that stores a plurality of connection patterns each of which indicates timings at which the communication terminal will access the server; a pattern selection section that selects one of the connection patterns from the storage section; and a first control section that controls the first communication section to transmit the connection pattern selected by the pattern selection section to the communication terminal the first communication section connects to; and the communication terminal including: a second communication section that connects to and communicates with the server; and a second control section that controls the second communication section to connect to the server at timing indicated in the connection pattern received by the second communication section.

In that manner, the server selects one of the connection patterns and transmits it to the communication terminal. The communication terminal connects to the server in accordance with the connection pattern it received from the server. This is a simple process and also prevents the communication terminals from accessing the server at the same time.

As mentioned above, the server selects one of the connection patterns and transmits it to the communication terminal. The communication terminal connects to the server in accordance with the connection pattern it received from the server. This is a simple process and also prevents the communication terminals from accessing the server at the same time. Thus, that can reduce the processing load regarding communication.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a schematic diagram illustrating a first case for comparison;

FIG. 7 is a schematic diagram illustrating a second case for comparison;

FIG. 8 is a schematic diagram illustrating a third case for comparison;

FIG. 9 is a schematic diagram illustrating the use of connection pattern data according to a first embodiment of the present invention;

FIG. 10 is a table illustrating the result of comparison;

DETAILED DESCRIPTION OF PREFERRED EMBODIMENTS

An embodiment of the present invention will be described in detail with reference to the accompanying drawings.

(1) First Embodiment

(1-1) Brief Overview of the Present Embodiment

Figure 1:
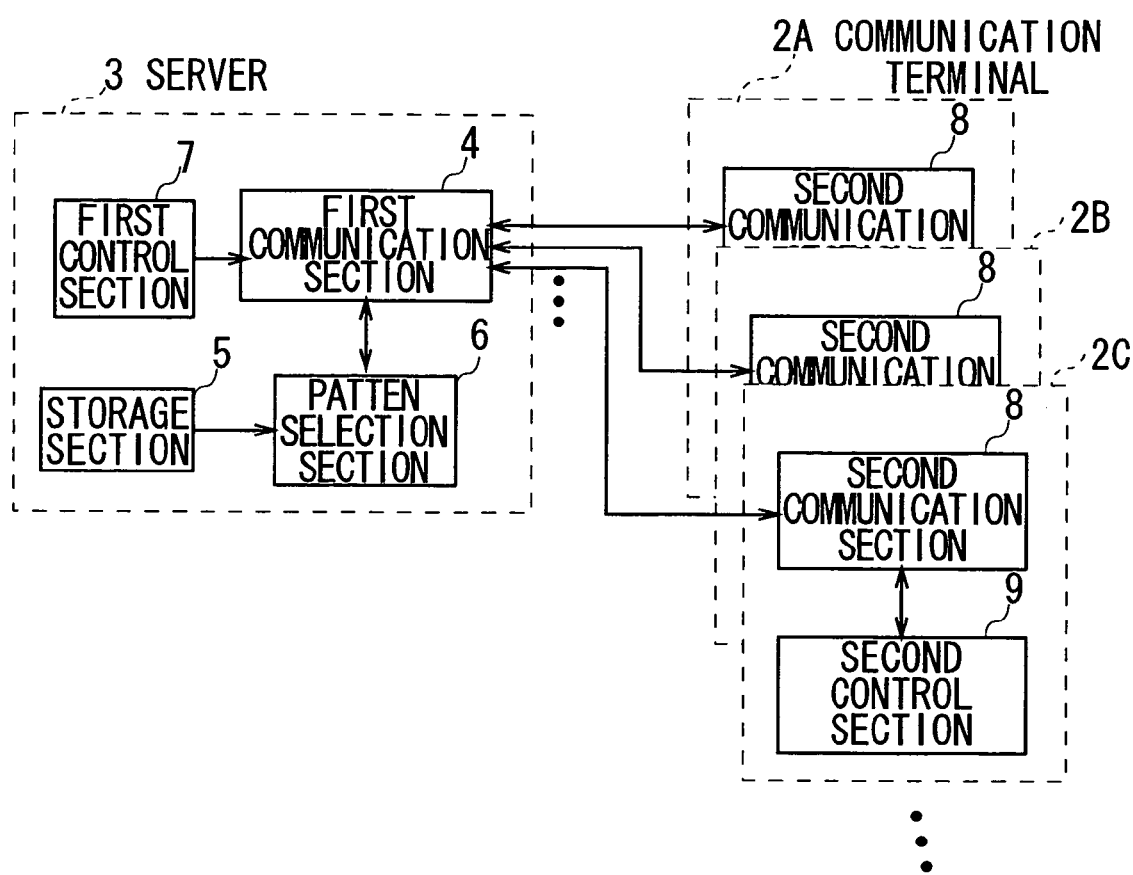
FIG. 1 is a block diagram illustrating a communication system according to a first embodiment of the present invention.

In FIG. 1, the reference numeral 1 denotes a communication system according to an embodiment of the present invention, including a plurality of communication terminals 2 (2A, 2B, 2C, . . . ) and a server 3 that communicates with the terminals 2. The server 3 includes a first communication section 4 that communicates with the terminals 2 (2A, 2B, 2C, . . . ). The server 3 also includes a storage section 5 that stores a plurality of connection pattern data sets, each of which indicates the timing when a communication terminal 2 will connect to the server 3. The server 3 also includes a pattern selection section 6 that selects one of the connection pattern data sets from the storage section 5. The server 3 also includes a first control section 7 that controls the first communication section 4 to transmit a connection pattern data set selected by the pattern selection section 6 to a communication terminal 2 which the first communication section 4 is communicating with. On the other hand, each communication terminal 2 includes a second communication section 8 that communicates with the server 3. The second communication section 8 receives a connection pattern data set. Each communication terminal 2 also includes a second control section 9 that controls the second communication section 8 such that the second communication section 8 connects to the server 3 at the timing indicated by the received connection pattern data set. In that manner, the server 3 selects one of the connection pattern data sets and then transmits it to the communication terminals 2; each communication terminal 2 connects to the server 3 at the timing indicated by the connection pattern data set supplied from the server 3. This simple process prevents a lot of communication terminals 2 from accessing the server 3 at the same time, reducing the processing load regarding communication.

(1-2) Communication System

Figure 2:
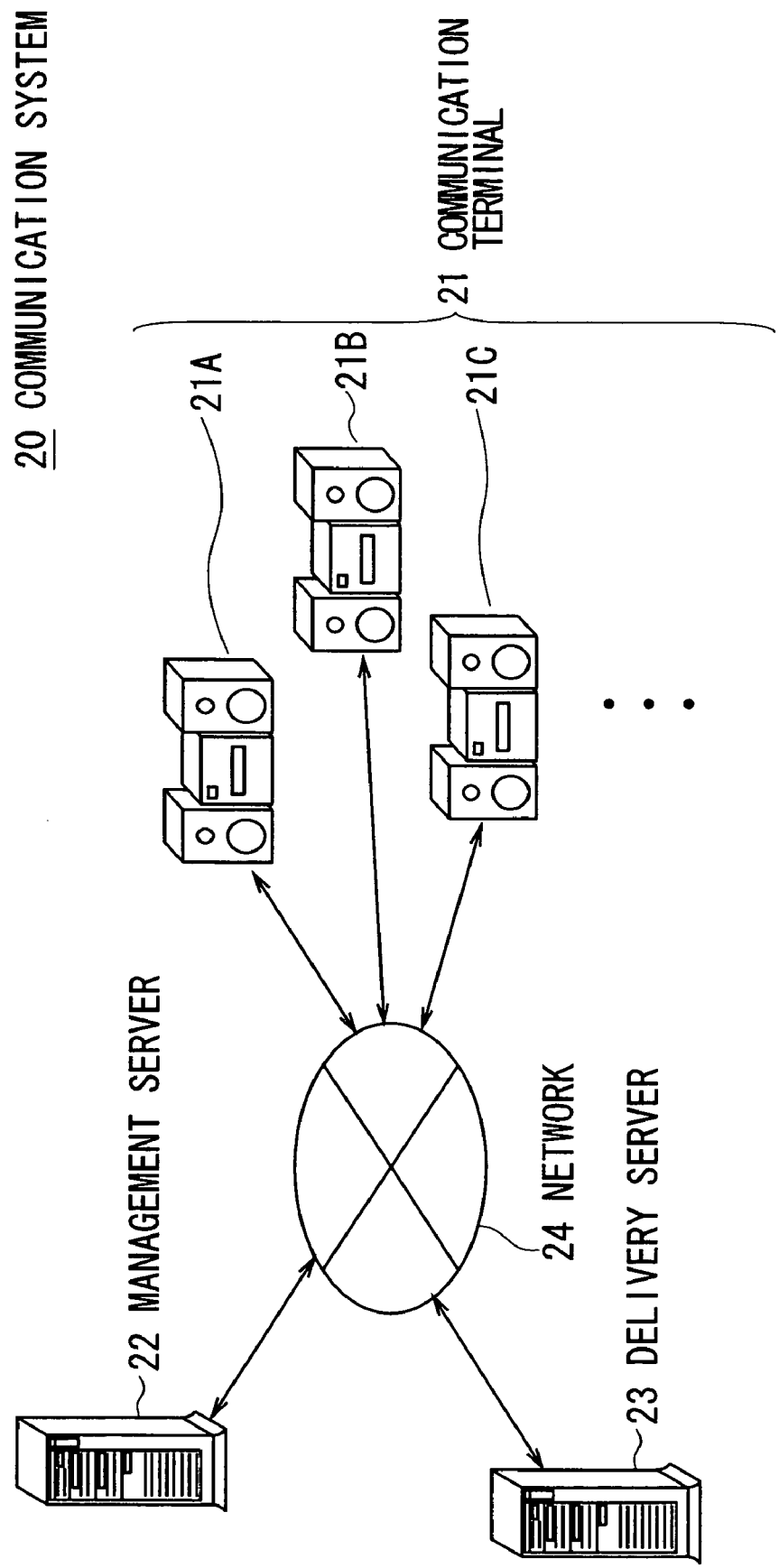
FIG. 2 is a schematic diagram illustrating the configuration of a communication system according to a first embodiment of the present invention.

In FIG. 2, the reference numeral 20 denotes a communication system as a whole. The communication system 20 includes a plurality of communication terminals 21 (21A, 21B, 21C, . . . ), a management server 22 and a delivery server 23. The communication terminals 21 connect to the servers 22 and 23 via a network 24 such as the Internet. In this case, the communication terminals 21 access the management server 22 and acquires an address of the delivery server 23 (such as Universal Resource Identifier (URI)), which delivers information (communication data) for users. The communication terminals 21 connect to the delivery server 23 in accordance with the address and acquire the communication data from the delivery server 23.

(1-3) Communication Terminal

Figure 3:
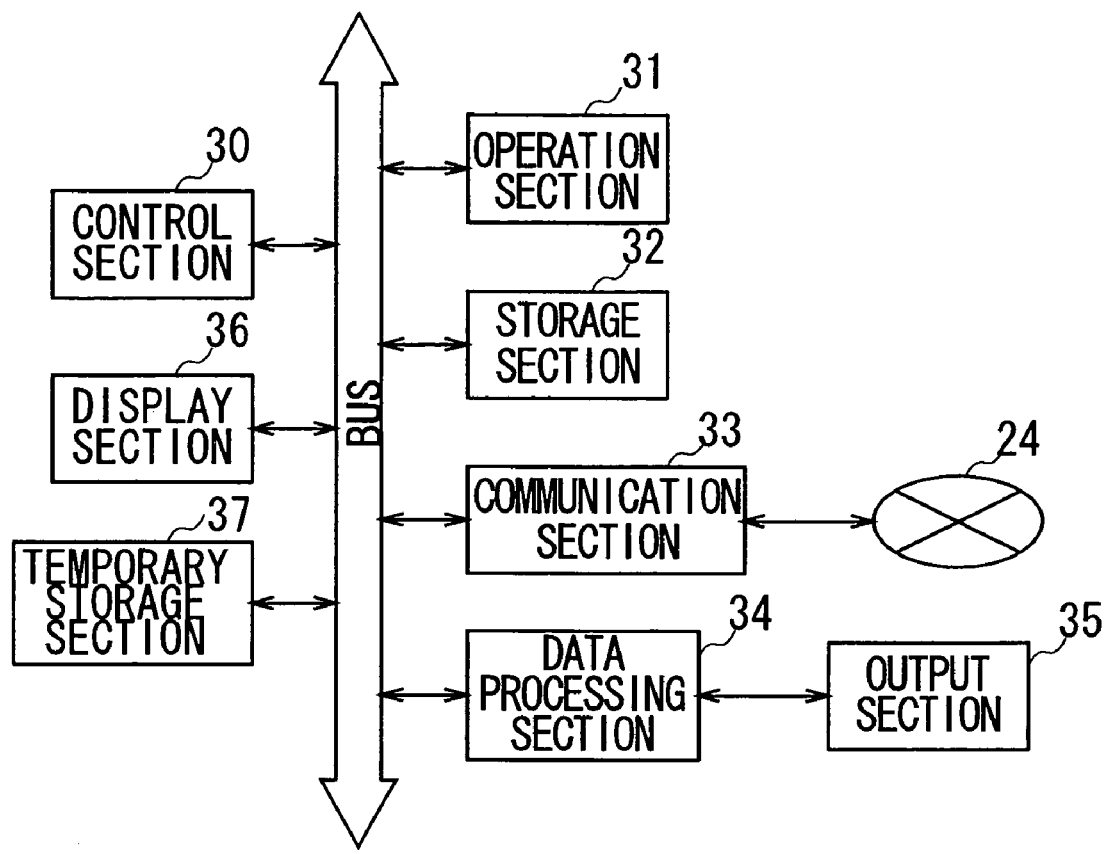
FIG. 3 is a block diagram illustrating the configuration of a communication terminal according to a first embodiment of the present invention.

FIG. 3 illustrates a hardware configuration of the communication terminal 21 using functional circuit blocks. The communication terminal 21 includes a control section 30. When various commands are input through an operation section 31, the control section 30 reads out programs (such as a basic program and application programs) from a storage section 32. The control section 30 executes those programs and takes overall control of the terminal 21. The control section 30 performs a predetermined arithmetic process and various processes in response to various commands input through the operation section 31.

When an operation command that orders the control section 30 to record music data from media such as Compact Disc (CD) is input through the operation section 31, the control section 30 of the communication terminal 21 reads out from the communication terminal 21 or a medium in a drive device (not shown) music data and stores it in the storage section 32. When an operation command that orders the control section 30 to acquire music data from the delivery server 23 is input through the operation section 31, the control section 30 controls a communication section 33 to acquire the address of the delivery server 23 from the management server 22 (FIG. 2) via the network 24. The control section 30 subsequently controls, in accordance with the acquired address, the communication section 33 to connect to the delivery server 23 via the network 24 and demands music data from the delivery server 23. As a result, the control section 30 receives the music data from the delivery server 23 through the communication section 33 and stores it in the storage section 32. In this manner, the control section 30 can store lots of music data sets in the storage section 32.

When one of the music data sets in the storage section 32 is selected and its playback command is input through the operation section 31, the control section 30 of the communication terminal 21 reads out the selected music data set from the storage section 32. The control section 30 controls a data processing section 34 to perform a playback process to the music data set and then supplies the resultant signals to an output section 35, which includes an amplifier and speaker. The output section 35 therefore output music. When an operation command that orders the control section 30 to play back music from media is input through the operation section 31, the control section 30 reads out a music data set from a medium in a drive section of the communication terminal 21 and supplies it to the output section 35 through the data processing section 34. In this manner the control section 30 can play music from media and outputs it from the output section 35.

The control section 30 of the communication terminal 21 is designed to generate data to be displayed: The data represents the result of various processes such as acquiring music data sets, recording or playback. The control section 30 supplies the data to a display section 36 (including a display control section and a display), which then displays various screens regarding the processes of acquiring music data sets, recording or playback.

The control section 30 of the communication terminal 21 also controls the communication section 33 to connect via the network 24 to the delivery server 23 at certain timing. The control section 30 acquires from the delivery server 23 the presentation data such as information to be displayed regarding a new, hit song, recommended music, high-profile artists, breaking news or the like (also referred to as a "presentation data set"). The control section 30 temporarily stores the acquired presentation data set in a temporary storages section 37 (or a cache memory). The control section 30 sequentially reads out the presentation data sets from the temporary storage section 37 and displays them on the display section 36.

After being switched on through the operation section 31, the control section 30 of the communication terminal 21 starts operating. Subsequently, the control section 30 checks if the connection to the network 24 through the communication section 33 has been established. After confirming the connection, the control section 30 accesses the management server 22 via the network 24 in accordance the address data stored in an internal memory (not shown) or the storage section 32 and establishes the connection with the management server 22. The control section 30 subsequently transmits an initial setting demand signal that demands the initial setting information for connecting to the delivery server 23 which can deliver the presentation data set.

(1-4) Configuration of the Management Server

Figure 4:
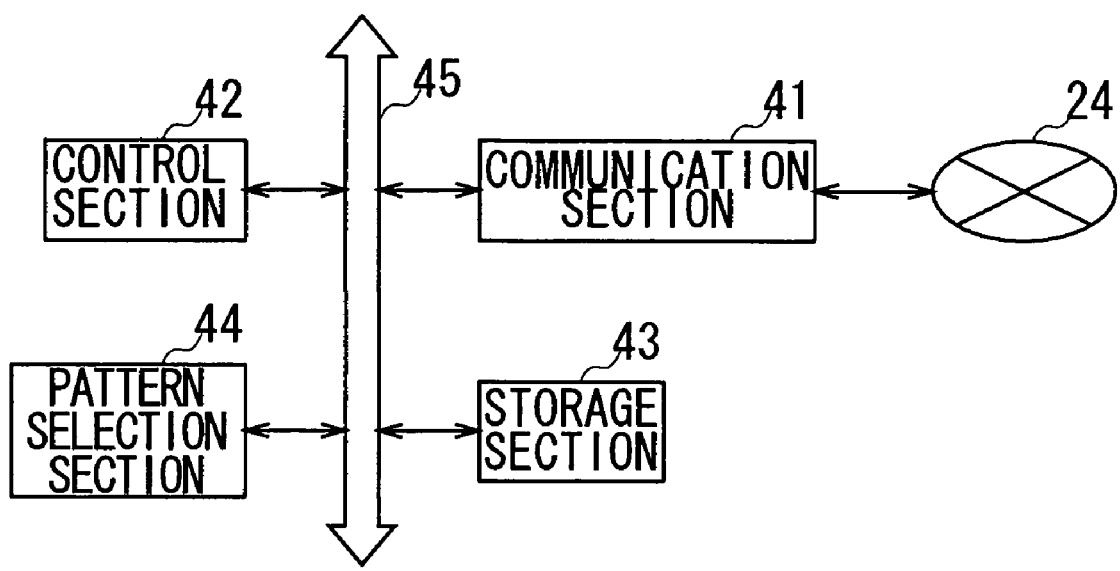
FIG. 4 is a block diagram illustrating the configuration of a management server according to a first embodiment of the present invention.

FIG. 4 illustrates the hardware configuration of the management server 22 using functional circuit blocks. The management server 22 includes a communication section 41 that communicates with the communication terminals 21 via the network 24. The management server 22 includes a control section 42 that reads out programs from a storage section 43 to execute them. The control section 42 controls each section through a bus 45 and performs various processes.

The storage section 43 has previously stored "connection pattern data sets" each of which indicates when the communication terminals 21 will access the delivery server 23 (described later). The storage section 43 also has stored the address data of the delivery server 23.

After the communication section 41 has received an initial setting demand signal from a communication terminal 21 via the network 24, the control section 42 of the management server 22 controls, in accordance with the received demand signal, a pattern selection section 44 to randomly select one of the connection pattern data sets from the storage section 43. In addition, the control section 42 reads out, in accordance with the received demand signal, from the storage section 43 the address data of the delivery server 23. The control section 42 subsequently generates initial setting information, including the selected connection pattern data and the address data of the delivery server 23, and then transmits it to the communication terminals 21.

In that manner, the management server 22 transmits to the communication terminals 21 the initial setting information including the address of the delivery server 23 and the connection pattern data indicating when it should access the delivery server 23.

After having received the initial setting information including the address of the delivery server 23 and the connection pattern data, the communication terminal 21 accesses the address of the delivery server 23 at the timing the connection pattern data indicates. The communication terminal 21 subsequently transmits, through the communication section 33, to the delivery server 23 a presentation data set demand signal that demands the presentation data sets that can be received during the connection time the connection pattern data indicates.

(1-5) Configuration of the Delivery Server

Figure 5:
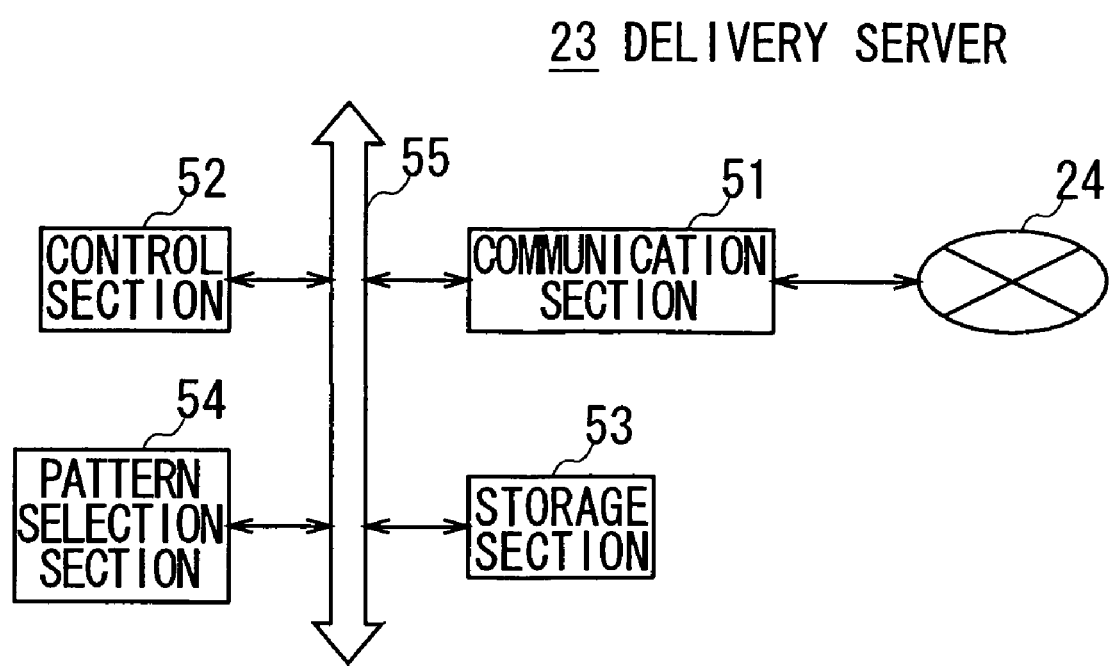
FIG. 5 is a block diagram illustrating the configuration of a delivery server according to a first embodiment of the present invention.

FIG. 5 illustrates the hardware configuration of the delivery server 23 using functional circuit blocks. The delivery server 23 includes a communication section 51 that communicates with the communication terminals 21 via the network 24. The delivery server 23 includes a control section 52 that reads out programs from a storage section 53 to execute them. The control section 52 controls each section through a bus 55 and performs various processes.

The storage section 53 has previously stored the presentation data sets in the format of extensible Markup Language (XML) or other streaming type formats: The presentation data sets to be displayed on the display section 36 of the communication terminal 21 include information regarding a new, hit song, recommended music, high-profile artists, weather prediction or the like. Each time the control section 52 of the delivery server 23 receives new information, it updates the presentation data sets stored in the storage section 53.

When having received a presentation data set demand signal from a communication terminal 21 through a communication section 51 via the network 24, the control section 52 reads out from the storage section 53 some of the presentation data sets that the received demand signal demands and then transmits them to the terminal 21.

In that manner, in response to the presentation data set demand signal from the communication terminals 21, the delivery server 23 transmits the presentation data sets to the communication terminals 21.

The control section 30 of the communication terminal 21 receives from the delivery server 23 the presentation data sets through the communication section 33 and temporarily stores them in the temporary storage section 37. The control section 30 then reads out the presentation data sets from the temporary storage section 37 and displays them on the display section 36. After having received all the presentation data sets from the delivery server 23, the control section 30 controls the communication section 33 to get disconnected from the delivery server 23. If there is the unchecked timing, indicating when it will access the delivery server 23 again, on the connection pattern data set, the control section 30 will access the delivery server 23 again and acquire the presentation data sets.

In that manner, the communication terminals 21 connect to the delivery server 23 and acquire the presentation data sets from the server 23 at the timing the connection pattern data indicate.

(1-6) Connection Pattern Data

The storage section 43 of the management server 22 has previously stored the connection pattern data sets.

In the communication system 20, there is a predetermined basic period of time from when the communication terminal 21 has accessed the delivery server 23 until the next time the communication terminal 21 accesses the delivery server 23 (also referred to as "connection unit time"). The connection pattern data set includes a combination of numbers each of which indicates the connection time which is a period of time calculated by multiplying the connection unit time by a natural number less than or equal to a predetermined threshold.

Assuming that the connection unit time is 15 seconds and the threshold is "3", there are three patterns of connection time calculated by multiplying 15 by 1, 2 and 3: the first connection time of 15 seconds, the second connection time of 30 seconds and the third connection time of 45 seconds. Accordingly, the storage section 43 has stored six patterns of how often the communication terminal 21 accesses the delivery server 23: "15-30-45 (seconds)", "15-45-30 (seconds)", "30-45-15 (seconds)", "30-15-45 (seconds)", "45-15-30 (seconds)" and "45-30-15 (seconds)". Hereinafter, it is assumed that the connection unit time is 15 seconds and the threshold is "3".

(1-7) Comparison of Connection Patterns

Following describes the network load (such as bandwidth usage rate on the network 24) and the processing load of the delivery server 23, to which the communication terminal 21 is connected in accordance with the connection pattern data sets, in the following three cases: the first case in which the communication terminal 21 accesses the delivery server 23 at intervals of 15 seconds (the first connection time), the second case in which the communication terminal 21 accesses the delivery server 23 at intervals of 30 seconds (the second connection time) and the third case in which the communication terminal 21 accesses the delivery server 23 at intervals of 45 seconds (the third connection time).

(1-7-1) First Case

As shown in FIG. 6, assume that in the first case, there are three communication terminals 21A, 21B and 21C, which access the delivery server 23 at intervals of 15 seconds (the first connection time) at the same time. Following describes the network load NL on the network 24 and the server load SL of the delivery server 23.

The control section 30 of each communication terminal 21A, 21B and 21C accesses the delivery server 23 at intervals of the first connection time CT1 or 15 seconds, which was calculated by ("Connection Unit Time UT (15 seconds)"×1), like t1, t2, t3, t4, t5 and t6, as shown in FIG. 6A. The control section 30 subsequently transmits to the server 23 a presentation data set demand signal that demands the presentation data UD whose amount is determined based on the connection unit time UT (also referred to as "delivery unit data UD"). When having received the demand signal, the control section 52 of the server 23 reads out from the storage section 53 a part of the presentation data sets as the delivery unit data UD and supplies it to the terminals 21A, 21B and 21C via the network 24. By the way, the size of the delivery unit data UD delivered has been adjusted, based on the prediction of the rate of network 24's communication, to maintain the network 24's communication efficiency. In fact, the size of the delivery unit data UD delivered is enough to be displayed for the period of the connection unit time UT. The amount of the presentation data (or the number of the delivery unit data sets UD), which is delivered from the management server 22 to the terminal 21 at one time, is determined based on the maximum space of the temporary storage section 37 of the terminals 21.

Accordingly, as shown in FIG. 6B, the server load SL1 of the server 23 (when connected) increases at a time instance t1 when the three terminals 21A, 21B and 21C access the delivery server 23 and form the sockets or duplex channel by for example specifying a pair of IP address and port number of TCP/IP at the same time. The server load SL2 of the server 23 (when delivering) also increases when the server 23 delivers the data UD through three sockets to the terminals 21A, 21B and 21C, but the server load SL2 is smaller than the sever load SL1. The server load SL3 of the server 23 (when disconnected) also increases when the server 23 is disconnected from the terminals 21A, 21B and 21C by removing the three sockets, but the server load SL3 is smaller than the server load SL2. Those server loads SL1, SL2 and SL3 occurs at intervals of 15 seconds (the first connection time CT1) like t1, t2, t3, t4, t5 and t6.

However, the server load SL1 (when connected) is the most potent one that can affect the other operation of the delivery server 23. Accordingly, the following primarily describes the server load SL1. In the first case, the server load SL1 increases six times for the period of 90 seconds ("Connection Unit Time UT"×6).

As shown in FIG. 6C, in the first case, the network load NL increases during the periods of "t1-t2", "t2-t3", "t3-t4", "t4-t5" and "t5-t6" because one delivery unit data set UD is delivered to each terminal 21A, 21B and 21C each time. Accordingly, there is a continuous network load NL on the network 24 for the period of t1 to t6 because the delivery unit data UT are constantly delivered to the terminals 21A, 21B and 21C.

(1-7-2) Second Case

As shown in FIG. 7, assume that in the second case, there are three communication terminals 21A, 21B and 21C, each of which accesses the delivery server 23 at intervals of 30 seconds (the second connection time). Following describes the network load NL on the network 24 and the server load SL of the delivery server 23.

The control section 30 of each communication terminal 21A, 21B and 21C accesses the delivery server 23 at intervals of the second connection time CT2 or 30 seconds, which was calculated by ("Connection Unit Time UT (15 seconds)"×2), like t1, t3 and t5, as shown in FIG. 7A. The control section 30 subsequently transmits to the server 23 a presentation data set demand signal that demands the presentation data UD equivalent to two delivery unit data sets UD. When having received the demand signal, the control section 52 of the server 23 reads out from the storage section 53 the two delivery unit data sets UD and supplies them to the terminals 21A, 21B and 21C via the network 24.

Accordingly, as shown in FIG. 7B, the server load SL1 of the server 23 (when connected) increases each time t1, t3 and t5 when the three terminals 21A, 21B and 21C access the delivery server 23 and form the sockets at the same time. The server loads SL1 occurs at intervals of 30 seconds (the second connection time CT2) like t1, t3 and t5. In the second case, the server load SL1 increases three times for the period of 90 seconds ("Connection Unit Time UT"×6).

As shown in FIG. 7C, in the second case, the network load NL increases during the periods of "t1-t2", "t3-t4" and "t5-t6" because two delivery unit data sets UD are delivered to each terminal 21A, 21B and 21C each time. On the other hand, there is substantially no network load during the periods of "t2-t3" and "t4-t5" and after t6. Accordingly, there are intermittent network loads NL on the network 24 for the period of t1 to t6 because the delivery unit data UT are intermittently delivered to the terminals 21A, 21B and 21C. This is not an efficient way to use the network 24.

(1-7-3) Third Case

As shown in FIG. 8, assume that in the third case, there are three communication terminals 21A, 21B and 21C, each of which accesses the delivery server 23 at intervals of 45 seconds (the third connection time). Following describes the network load NL on the network 24 and the server load SL of the delivery server 23.

The control section 30 of each communication terminal 21A, 21B and 21C accesses the delivery server 23 at intervals of the third connection time CT3 or 45 seconds, which was calculated by ("Connection Unit Time UT (15 seconds)"×3), like t1 and t4, as shown in FIG. 8A. The control section 30 subsequently transmits to the server 23 a presentation data set demand signal that demands the presentation data equivalent to three delivery unit data sets UD. When having received the demand signal, the control section 52 of the server 23 reads out from the storage section 53 the three delivery unit data sets UD and supplies them to the terminals 21A, 21B and 21C via the network 24.

Accordingly, as shown in FIG. 8B, the server load SL1 of the server 23 (when connected) increases each time t1 and t4 when the three terminals 21A, 21B and 21C access the delivery server 23 and form the sockets at the same time. The server loads SL1 occurs at intervals of 45 seconds (the third connection time CT3) like t1 and t4. In the third case, the server load SL1 increases two times for the period of 90 seconds ("Connection Unit Time UT"×6).

As shown in FIG. 8C, in the third case, the network load NL increases during the periods of "t1-t2" and "t4-t5" because three delivery unit data sets UD are delivered to each terminal 21A, 21B and 21C each time. On the other hand, there is substantially no network load during the periods of "t2-t4" and after t5. Accordingly, there are intermittent network loads NL on the network 24 for the period of t1 to t6 because the delivery unit data UT are intermittently delivered to the terminals 21A, 21B and 21C. This is not an efficient way to use the network 24.

(1-7-4) Connection Pattern of the First Embodiment

The following describes the server load of the server 23 and the network load NL on the network 24 in the first embodiment. In this case, the communication terminals 21A, 21B and 21C access the delivery server 23 randomly in accordance with the connection pattern data.

The control section 42 of the management server 22 reads out from the storage section 43 one of the connection pattern data sets ("15-30-45 (seconds)", "15-45-30 (seconds)", "30-45-15 (seconds)", "30-15-45 (seconds)", "45-15-30 (seconds)" or "45-30-15 (seconds)") and transmits it to the terminals 21A, 21B and 21C.

In fact, the number of users is equal to the number of terminals 21. Theoretically, every pattern data set is evenly delivered to each terminal 21. Accordingly, in this first embodiment, for ease of explanation, assume that each terminal 21A, 21B and 21C has received a different connection pattern data set: The communication terminals 21A, 21B and 21C have received from the management server 22 a pattern of "15-30-45 (seconds)", a pattern of "30-45-15 (seconds)" and a pattern of "45-15-30 (seconds)", respectively. FIG. 9 illustrates the server load SL and the network load NL in that case.

As shown in FIG. 9A, the control section 30 of the communication terminal 21A of the first embodiment accesses, in accordance with the connection pattern data of "15-30-45 (seconds)", the delivery server 23 at a time instant t1. The control section 30 subsequently transmits to the delivery server 23 a presentation data set demand signal that demands a certain amount of presentation data (equivalent to one delivery unit data UD) that it can receive for 15 seconds (the first connection time CT1). The control section 52 of the delivery server 23 reads out, in response to the presentation data set demand signal from the terminal 21A, a presentation data set or one delivery unit data set UD from the storage section 53 and delivers it to the terminal 21A. After 15 seconds have passed since then (i.e. at time instant t2), the control section 30 of the communication terminal 21A of the first embodiment accesses the delivery server 23. The control section 30 subsequently transmits to the delivery server 23 a presentation data set demand signal that demands a certain amount of presentation data (equivalent to two delivery unit data sets UD) that it can receive for 30 seconds (the second connection time CT2). The control section 52 of the delivery server 23 reads out, in response to the presentation data set demand signal from the terminal 21A, subsequent two presentation data sets or subsequent two delivery unit data sets UD from the storage section 53 and delivers them to the terminal 21A. After 30 seconds have passed since then (i.e. at time instant t4), the control section 30 of the communication terminal 21A of the first embodiment accesses the delivery server 23. The control section 30 subsequently transmits to the delivery server 23 a presentation data set demand signal that demands a certain amount of presentation data (equivalent to three delivery unit data sets UD) that it can receive for 45 seconds (the third connection time CT3). The control section 52 of the delivery server 23 reads out, in response to the presentation data set demand signal from the terminal 21A, subsequent three presentation data sets or subsequent three delivery unit data sets UD from the storage section 53 and delivers them to the terminal 21A.

The control section 30 of the communication terminal 21B of the first embodiment accesses, in accordance with the connection pattern data of "30-45-15 (seconds)", the delivery server 23 at a time instant t1. The control section 30 subsequently transmits to the delivery server 23 a presentation data set demand signal that demands a certain amount of presentation data (equivalent to two delivery unit data sets UD) that it can receive for 30 seconds (the second connection time CT2). The control section 52 of the delivery server 23 reads out, in response to the presentation data set demand signal from the terminal 21B, two presentation data sets or two delivery unit data sets UD from the storage section 53 and delivers them to the terminal 21B. After 30 seconds have passed since then (i.e. at time instant t3), the control section 30 of the communication terminal 21B of the first embodiment accesses the delivery server 23. The control section 30 subsequently transmits to the delivery server 23 a presentation data set demand signal that demands a certain amount of presentation data (equivalent to three delivery unit data sets UD) that it can receive for 45 seconds (the third connection time CT3). The control section 52 of the delivery server 23 reads out, in response to the presentation data set demand signal from the terminal 21B, subsequent three presentation data sets or subsequent three delivery unit data sets UD from the storage section 53 and delivers them to the terminal 21B. After 45 seconds have passed since then (i.e. at time instant t6), the control section 30 of the communication terminal 21B of the first embodiment accesses the delivery server 23. The control section 30 subsequently transmits to the delivery server 23 a presentation data set demand signal that demands a certain amount of presentation data (equivalent to one delivery unit data UD) that it can receive for 15 seconds (the first connection time CT1). The control section 52 of the delivery server 23 reads out, in response to the presentation data set demand signal from the terminal 21B, subsequent one presentation data set or subsequent one delivery unit data set UD from the storage section 53 and delivers it to the terminal 21B.

The control section 30 of the communication terminal 21C of the first embodiment accesses, in accordance with the connection pattern data of "45-15-30 (seconds)", the delivery server 23 at a time instant t1. The control section 30 subsequently transmits to the delivery server 23 a presentation data set demand signal that demands a certain amount of presentation data (equivalent to three delivery unit data sets UD) that it can receive for 45 seconds (the third connection time CT3). The control section 52 of the delivery server 23 reads out, in response to the presentation data set demand signal from the terminal 21C, three presentation data sets or three delivery unit data sets UD from the storage section 53 and delivers them to the terminal 21C. After 45 seconds have passed since then (i.e. at time instant t4), the control section 30 of the communication terminal 21C of the first embodiment accesses the delivery server 23. The control section 30 subsequently transmits to the delivery server 23 a presentation data set demand signal that demands a certain amount of presentation data (equivalent to one delivery unit data set UD) that it can receive for 15 seconds (the first connection time CT1). The control section 52 of the delivery server 23 reads out, in response to the presentation data set demand signal from the terminal 21C, subsequent one presentation data set or subsequent one delivery unit data set UD from the storage section 53 and delivers it to the terminal 21C. After 15 seconds have passed since then (i.e. at time instant t5), the control section 30 of the communication terminal 21C of the first embodiment accesses the delivery server 23. The control section 30 subsequently transmits to the delivery server 23 a presentation data set demand signal that demands a certain amount of presentation data (equivalent to two delivery unit data sets UD) that it can receive for 30 seconds (the second connection time CT2). The control section 52 of the delivery server 23 reads out, in response to the presentation data set demand signal from the terminal 21C, subsequent two presentation data sets or subsequent two delivery unit data sets UD from the storage section 53 and delivers them to the terminal 21C.

Accordingly, as shown in FIG. 9B, the server load SL1 increases just one time when the terminals 21A, 21B and 21C forms sockets with the delivery server 23 at the same time (at the time instant t1) and the load is well balanced except the time instant t1.

As shown in FIG. 9C, in the first embodiment, the network load NL has increased for the period of "t1 to t2", since two delivery unit data sets UD were delivered to each terminal 21A, 21B and 21C for that period. In addition, the network load NL has increased for the periods of "t2 to t3" and "t5 to t6", since two delivery unit data sets UD were delivered to the terminal 21A or 21C for that period. In addition, the network load NL has increased for the period of "t3 to t4", since three delivery unit data sets UD were delivered to the terminal 21B for that period. In addition, the network load NL has increased for the period of "t4 to t5", since three delivery unit data sets UD were delivered to the terminal 21A and one delivery unit data set UD was delivered to the terminal 21C for that period. In addition, the network load NL has increased for the period of "t5 to t6", since one delivery unit data set UD was delivered to the terminal 21B for that period. In that manner, the network load NL has increased a little bit higher during the period of "t1-t2" when the terminals 21B and 21C accesses the delivery server 23 at the same time. Except that, the network load NL is well balanced. The average of the number of delivery unit data sets UD the terminals 21A, 21B and 21C have received for 90 seconds is two.

(1-7-5) Comparison Result

FIG. 10 is comparing five factors regarding the server load SL and the network load NL between three cases and the first embodiment: "The average of the amount of data acquired", "The shortest connection time", "The longest connection time", "The average of the number of terminals connected at the same time" and "The number of times when the server load occurs". Each factor is evaluated by "Double Circle (two points)", "Single Circle (one point)", "Triangle (zero point)" and "X (minus one point)".

"The average of the amount of data acquired" is the average of the number of the delivery unit data sets UD the terminals 21A, 21B and 21 have acquired when connected to the delivery server 23: The first case is "One Time/Connection"; the second case is "Two Times/Connection"; the third case is "Three Times/Connection"; and the first embodiment is "Two Times/Connection". The more the data sets UD the higher the network load NL on the network 24. The less the data sets UD the higher the server load SL, because the terminals 21 access the delivery server 23 many times. The evaluation is: a "Triangle (zero point)" for the first and third cases and "Single Circle (one point)" for the second case and the first embodiment.

"The shortest connection timed" is the shortest time from when the communication terminals 21A, 21B and 21C access the delivery server 23 until they access the server 23 again: The first case is "Connection Unit Time UT×1"; the second case is "Connection Unit Time UT×2"; the third case is "Connection Unit Time UT×3"; and the first embodiment is "Connection Unit Time UT×1". The shorter the time, the more chances they have to update information. The evaluation is: a "Double Circle (two points)" for the first case and the first embodiment, a "Single Circle (one point)" for the second case and a "Triangle (zero point)" for the third case.

"The longest connection time" is the longest time from when the communication terminals 21A, 21B and 21C access the delivery server 23 until they access the server 23 again: The first case is "Connection Unit Time UT×1"; the second case is "Connection Unit Time UT×2"; the third case is "Connection Unit Time UT×3"; and the first embodiment is "Connection Unit Time UT×3". The longer the time, the less chance they have to update information. The evaluation is: a "Double Circle (two points)" for the first case, a "Single Circle (one point)" for the second case and a "Triangle (zero point)" for the third case and the first embodiment.

"The average of the number of terminals connected at the same time" is the number of terminals 21 connected to the delivery server 23 at the same time during the period of "Connection Unit Time UT×6": The first case is "Communication Terminal×3"; the second case is "Communication Terminal×1.5"; the third case is "Communication Terminal×1"; and the first embodiment is "Communication Terminal×1.5". The server load increases as the number of terminals 21 connected to the server 23 at the same time increases. The evaluation is: a "Double Circle (two points)" for the third case, a "Single Circle (one point)" for the second case and the first embodiment and a "Triangle (zero point)" for the first case.

"The number of times when the server load occurs" indicates how many times the server load SL1 occurs during the period of "Connection Unit Time UT×6": The first case is "Six Times"; the second case is "Three Times"; the third case is "Twice"; and the first embodiment is "One Time". The server load SL1 increases as they occur much more frequently. The evaluation is: a "Double Circle (two points)" for the first embodiment, a "Single Circle (one point)" for the third case, a "Triangle (zero point)" for the second case and a "X (minus one point)" for the first case.

Accordingly, the total of scores of the first case is three points. The total of scores of the second case is four points. The total of scores of the third case is three points. The total of scores of the first embodiment is six points. The following describes about the total scores.

In the first, second and third cases, those factors cancel each other. As a result, they are substantially at the same level, like "Three Points", "Four Points" and "Three Points". The second case is the average of scores of the first and third cases: The second case is more balanced than the first and third cases. As a result, the second case has got a higher score, or four points, than that of the first and third case. In the first, second and third cases, the terminals 21 repeatedly access the delivery server 23 even though the each case's connection time CT is different like the first connection time CT1 (15 seconds), the second connection time CT2 (30 seconds) and the third connection time CT3 (45 seconds). If the connection time becomes longer in order to reduce the number of times the server load SL1 occurs, then this means the terminals 21 have much less chances of updating information on the display section 36.

On the other hand, the first embodiment uses a connection pattern data that is a combination of the first connection time CT1, the second connection time and the third connection time CT3. The communication terminals 21 access the delivery server 23 in accordance with the connection pattern data. Accordingly, the first embodiment has got "Six Points" in total. In addition, each terminal 21 access the delivery server 23 at different timing in accordance with the connection pattern data. Accordingly, in the first embodiment, the server load SL1 occurs less often than the first, second and the third cases. Still, the terminals 21 can constantly update information on the display section 36.

In that manner, in the communication system 20 of the first embodiment, the communication terminals 21 access the delivery server 23 in accordance with the connection pattern data. Accordingly, the first embodiment demonstrates better characteristics than the first, second and third embodiments. In addition, the server load SL1 occurs less often than the first, second and the third cases. Still, the terminals 21 can constantly update information on the display section 36.

Moreover, the process of the communication system 20 of the first embodiment is simple: The system 20 randomly selects, in accordance with the request of the terminals 21, one of the connection pattern data sets from the storage section 43 of the management server 22 and transmits it to the terminal 21; and the terminals 21 access the delivery server 23 in accordance with the connection pattern data. This also prevents the communication terminals 21 from accessing the delivery server 23 at the same time. Accordingly, the server load SL1 of the delivery server 23 can be decreased.

In the communication system 20 of the first embodiment, the process between the communication terminal 21 and the delivery server 23 is simple: The communication terminal 21 asks the delivery server 23 for the amount of presentation data indicated by the connection pattern data and the delivery server 23 transmits it to the communication terminal 21 accordingly. Accordingly, the delivery server 23 just transmits only the amount of data, which is enough for displaying information on the display section 36 of the communication terminal 21. This helps reducing traffic on the network 24. In addition, that prevents the temporary storage section 37 of the communication terminal 21 from overflowing.

(1-8) Data Acquisition Process

Figure 11:
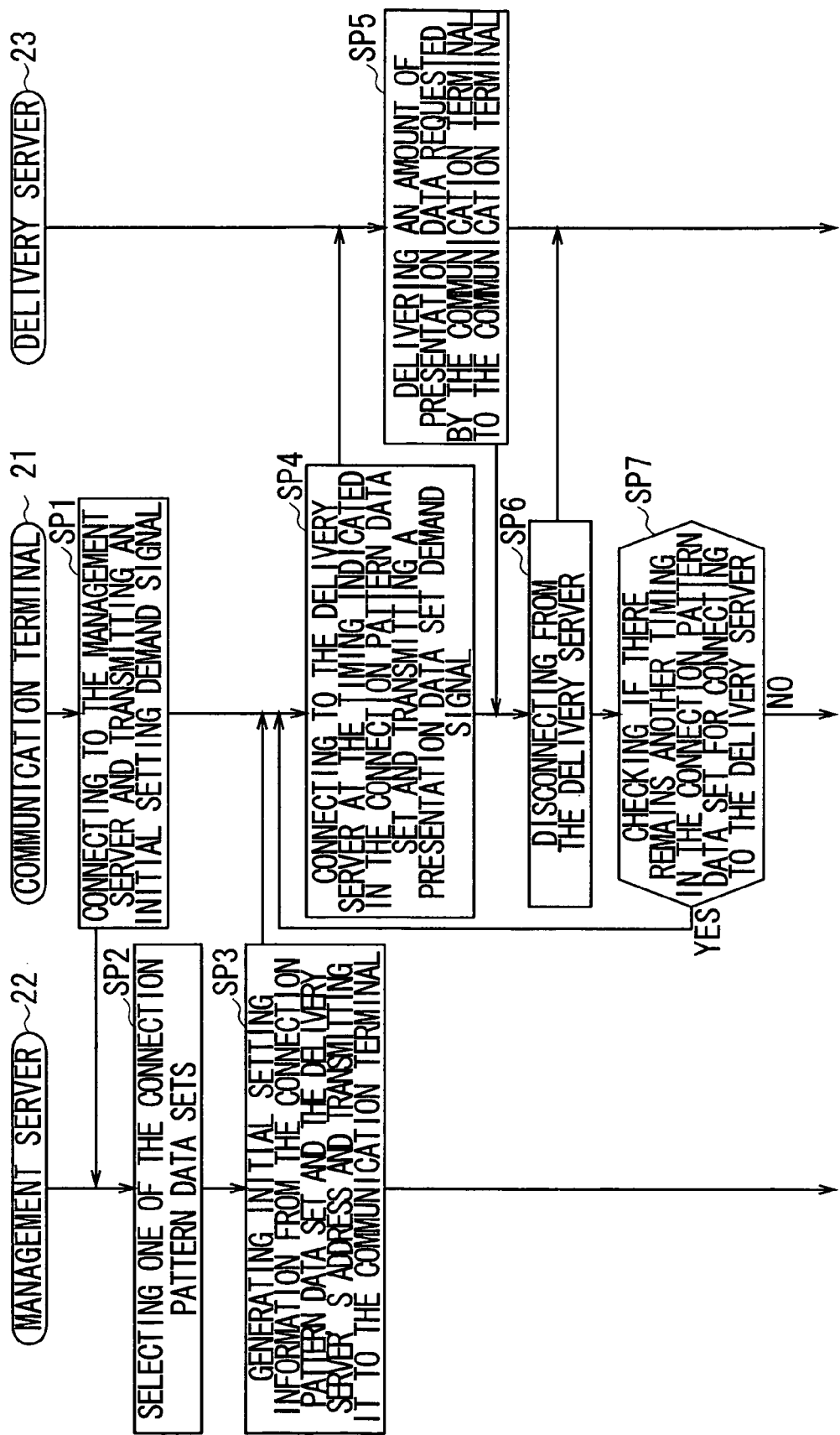
FIG. 11 is a sequence chart illustrating a data acquisition process according to a first embodiment of the present invention.

FIG. 11 is a sequence chart illustrating a procedure of a data acquisition process in which the communication terminal 21 communicates with the management server 22 and the delivery server 23 to acquire the presentation data. When being powered on through the operation section 31, the control section 30 of the communication terminal 21 starts operating and then proceeds to step SP1. At step SP1, the communication terminal 21 connects to the management server 22 and transmits an initial setting demand signal to the server 22 and then proceeds to step SP2.

At step SP2, the control section 42 of the management server 22 receives the initial setting demand signal. In accordance with the received demand signal, the control section 42 selects one of the connection pattern data sets from the storage section 43 and then proceeds to step SP3.

At step SP3, the control section 42 of the management server 22 generates initial setting information including the connection pattern data, read from the storage section 43, and the address of the delivery server 23. The control section 42 transmits the initial setting information to the terminal 21 and then proceeds to step SP4.

At step SP4, the control section 30 of the communication terminal 21 transmits a presentation data set demand signal to the delivery server 23 of the address indicated in the initial setting information at the timing indicated in the connection pattern data. The control section 30 proceeds to step SP5.

At step SP5, the control section 52 of the delivery server 23 reads out from the storage section 53 the presentation data sets whose amount is indicated in the presentation data demand signal and transmits it to the communication terminal 21 and then proceeds to step SP6.

At step SP6, the control section 30 of the communication terminal 21 receives the presentation data sets from the delivery server 23 and stores it in the temporary storage section 37. The control section 30 subsequently supplies it to the display section 36, which then displays information based on the presentation data sets. After having received all the presentation data sets from the delivery server 23, the control section 30 is disconnected form the delivery server 23 and then proceeds to step SP7.

At step SP7, the control section 30 of the communication terminal 21 checks if the connection pattern data indicates subsequent timings for connecting to the delivery server 23. Until it has got a negative result at step SP7, the control section 30 repeats the process of step SP4 to SP7.

In that manner, the communication terminal 21 acquires the presentation data sets from the delivery server 23 at timings indicated in the connection pattern data.

(1-9) Re-Acquisition of the Connection Pattern Data

Moreover, the communication terminal 21 can acquire the connection pattern data sets again from the delivery server 23.

In this case, the control section 52 of the delivery server 23 has previously stored in the storage section 53 the connection pattern data sets, which are the same as those in the storage section 43 of the management server 22.

When the control section 30 of the terminal 21 accesses the delivery server 23 at the timing that is the last in the list of the connection pattern data acquired from the management server 22, the control section 30 transmits via the communication section 33 to the delivery server 23, instead of the presentation data set demand signal, a pattern data demand signal that demands a new connection pattern data set.

The control section 52 of the delivery server 23 receives, through the communication section 51, the pattern data demand signal from the terminal 21 via the network 24. In response, the control section 54 controls a pattern selection section 54 to randomly select one of the connection pattern data sets from the storage section 53 and transmits it to the terminal 21.

The control section 30 of the communication terminal 21 receives, through the communication section 33, the connection pattern data set from the delivery server 23 and then transmits a presentation data set demand signal, generated in accordance with the connection pattern data set, to the delivery server 23.

In that manner, when the control section 30 of the terminal 21 accesses the delivery server 23 at the timing that is the last in the list of the connection pattern data, the control section 30 transmits a pattern data demand signal. Accordingly, without establishing connection with the management server 22, the terminal 21 can acquire a new connection pattern data set from the connected delivery server 23.

(1-10) Pattern Re-Acquisition Process

Figure 12:
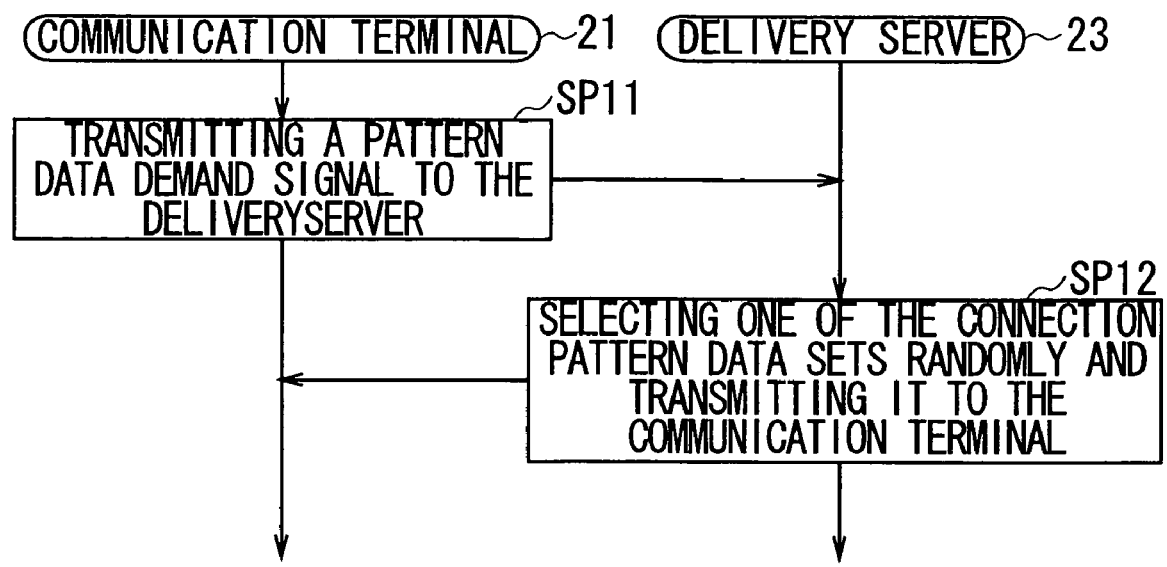
FIG. 12 is a sequence chart illustrating a pattern re-acquisition process according to a first embodiment of the present invention.

FIG. 12 is a sequence chart illustrating a pattern re-acquisition process in which the communication terminal 21 acquires a new connection pattern data set from the delivery server 23. When the control section 30 of the terminal 21 accesses the delivery server 23 at the timing that is the last in the list of the connection pattern data, the control section 30 at step SP11 transmits a pattern data demand signal to the delivery server 23 and then proceeds to step SP12.

At step SP12, the control section 52 of the delivery server 23 receives, through the communication section 51, a pattern data demand signal from the terminal 21 and randomly selects one of the connection pattern data sets from the storage section 53 and then transmits it to the communication terminal 21.

In that manner, the control section 30 of the communication terminal 21 can acquire a new connection pattern data set from the delivery server 23.

(1-11) Presentation of Emergency Information

In the communication system 20 including the communication terminals 21 and the delivery server 23, the emergency information, included in the presentation data, is given priority to be displayed on the display section 36 of the communication terminal 21.

When the control section 52 of the delivery server 23 updates the presentation data sets in the storage section 53 in accordance with new information, the control section 52 checks if the new information includes emergency information (such as corrected information of the transmitted presentation data or breaking news). If the new information includes emergency information, the control section 52 adds an identification tag to the portion of the emergency information.

When the control section 52 of the delivery server 23 receives, through the communication section 51, a presentation data set demand signal from the communication terminal 21 via the network 24, the control section 52 reads out the presentation data sets, whose amount is indicated in the presentation data set demand signal, from a streaming of the presentation data to be stored in the storage section 53, for example. The control section 52 transmits it to the communication terminal 21.

The control section 30 of the communication terminal 21 receives, through the communication section 33, the presentation data sets from the delivery server 23 and stores them in the temporary storage section 37. The control section 30 subsequently transmits the presentation data sets from the temporary storage section 37 to the display section 36, which then displays information based on the presentation data sets. If there is an identification tag attached to the presentation data sets delivered from the delivery server 23, the portion of data attached to the identification tag is given priority for being displayed on the display section 36. Accordingly, a user can confirm the emergency information as soon as possible.

(1-12) Change of Connection Pattern Data

The connection pattern data can be changed in the communication system including the communication terminal 21, the management server 22 and the delivery server 23.

For example there are different connection pattern data sets: a first connection pattern data set is generated based on the connection unit time UT of 15 seconds and the predetermined natural number of 3 while a second connection pattern data set is generated based on the connection unit time UT of 15 seconds and the predetermined natural number of 4. In addition, there may be many connection pattern data sets with different unit times UT and natural numbers. The following primarily describes the second connection pattern data sets (24 patterns), one of which is "15-30-45-60 seconds" which is calculated by multiplying 15 seconds by 1, 2, 3 and 4.

In this case, the control section 42 of the management server 22 has previously stored in the storage section 43 the second connection pattern data sets as well as the first connection pattern data sets. Similarly, the storage section 53 of the delivery server 23 also has stored the same second connection pattern data sets in order to allow the terminals 21 to acquire them from the delivery server 23.

When a user operates to change the connection pattern data for example, the control section 52 of the delivery server 23 generates a pattern change demand signal that asks to use the second connection pattern data sets, which are different from the first connection pattern data sets the terminals 21 currently uses. After that, the control section 52 transmits to the terminals 21 the pattern change demand signal(as well as delivering the presentation data sets) when the terminals 21 access the delivery server 23.

The control section 30 of the communication terminal 21 transmits the pattern change demand signal, received from the delivery server 23, to the management server 22.

The control section 42 of the management server 22 receives, through the communication section 41, the pattern change demand signal from the communication terminal 21 via the network 24. In accordance with the received pattern change demand signal, the control section 42 controls the pattern selection section 44 to select one of the second connection pattern data sets from the storage section 43. The control section 42 generates a pattern change notification signal, which informs that the connection pattern data have changed, and transmits it to the communication terminal 21 along with the selected second connection pattern dataset.

In accordance with the pattern change notification signal from the management server 22, the control section 30 of the communication terminal 21 will use the second connection pattern data sets instead of the first connection pattern data sets.

In that manner, when a user operates to change the connection pattern data sets, they can be changed in the communication system 20 including the communication terminals 21, the management server 22 and the delivery server 23.

(1-13) Pattern Change Process

Figure 13:
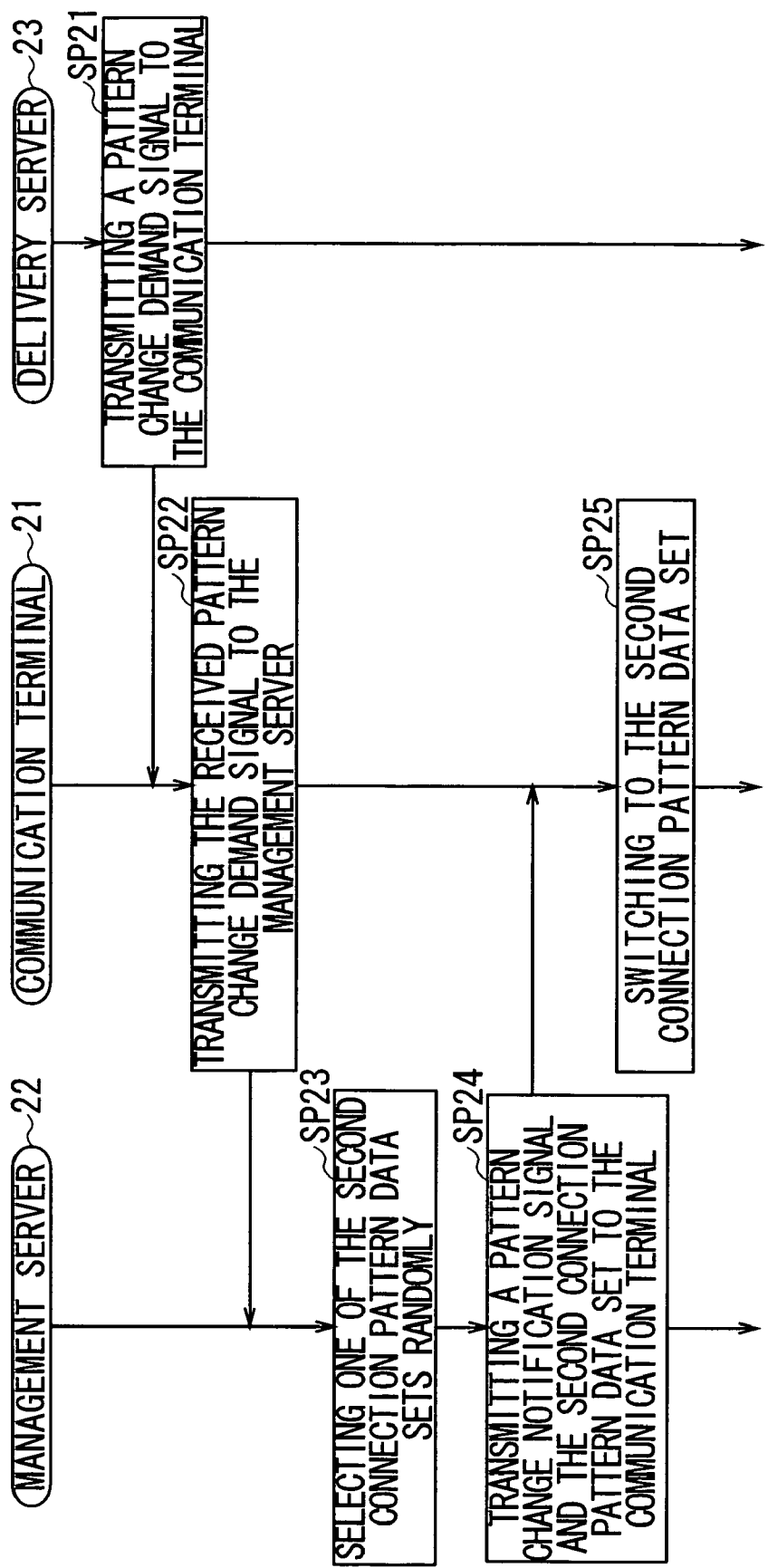
FIG. 13 is a sequence chart illustrating a pattern change process according to a first embodiment of the present invention.

FIG. 13 is a sequence chart illustrating a pattern change process in which the pattern data sets are changed in the communication system 20 including the communication terminals 21, the management server 22 and the delivery server 23. When a user inputs a command to change the connection pattern data sets, the control section 52 of the delivery server 23 at step SP21 transmits a pattern change demand signal, along with the presentation data sets, to the communication terminals 21 connected to the delivery server 23 via the network and then proceeds to step SP22.

At step SP22, the control section 30 of the communication terminal 21 transmits the pattern change demand signal, delivered from the delivery server 23, to the management server 22 and then proceeds to step SP23.

At step SP23, in response to the pattern change demand signal, the control section 42 of the management server 22 randomly reads out from the storage section 43 one of the second connection pattern data sets and then proceeds to step SP24.

At step SP24, the control section 42 of the management server 22 transmits the second connection pattern data set, read out from the storage section 43, and a pattern change notification signal to the communication terminal 21 and then proceeds to step SP25.

In response to the pattern change notification signal from the management server 22, the control section 30 of the communication terminal 21 at step SP25 will use the second connection pattern data sets instead of the first connection pattern data sets.

In that manner, the connection pattern data sets to be used can change in the communication system 20 including the communication terminals 21 and the delivery server 23.

(1-14) Operation and Effect of the First Embodiment

When having received an initial setting demand signal from the communication terminal 21, the control section 42 of the management server 22 randomly reads out one of the connection pattern data sets from the storage section 43 and transmits it, along with the address of the delivery server 23, to the communication terminal 21 as the initial setting information. The control section 30 of the communication terminal 21 therefore will access the delivery server 23 at the timing indicated in the connection pattern data.

In that manner, the process of the communication system 20 is simple: In response to a demand signal from the communication terminal 21, the management server 22 randomly reads out one of the connection pattern data sets from the storage section 43 and transmits it to the communication terminal 21 and the communication terminal 21 therefore will access the delivery server 23 at the timing indicated in the connection pattern data. This prevents the communication terminals 21 from accessing the delivery server 23 at the same time, reducing the server load SL of the delivery server 23.

When being connected to the delivery server 23 at the timing indicated in the connection pattern data, the control section 30 of the communication terminal 21 transmits to the delivery server 23 a presentation data demand signal that demands an amount of presentation data the communication terminal 21 can receive during the period of time from when the communication terminal 21 was connected to the delivery server 23 until the communication terminal 21 will access the delivery server 23 again. In response to the presentation data demand signal, the control section 52 of the delivery server 23 reads out from the storage section 53 that amount of presentation data and transmits it to the communication terminal 21.

In that manner, the process of the communication system 20 is simple: The communication terminal 21 demands from the delivery server 23 the amount of presentation data based on the connection pattern data and the delivery server 23 delivers that amount of presentation data to the communication terminal 21. In this way, the communication terminal 21 can receive from the delivery server 23 the amount of presentation data enough to display information on the display section 36. This reduces traffic and load on the network 24. In addition, this prevents the temporary storage section 37 of the communication terminal 21 from overflowing.

According to the above configuration, the process of the communication system 20 is simple: The storage section 43 of the management server 22 has previously stored the connection pattern data sets indicating the timings at which the communication terminals 21 will access the delivery server 23; the management server 22 randomly reads out one of the connection pattern data sets from the storage section 43 in accordance with a demand from the communication terminal 21 and transmits it to the communication terminal 21; and the communication terminal 21 will access the delivery server 23 in accordance with the connection pattern data set. This prevents the communication terminals 21 from accessing the delivery server 23 at the same time, reducing the processing load of communication.

(1-15) Other Embodiment Regarding the First Embodiment

In the above-noted first embodiment, one of the connection pattern data sets is selected from the storage section 43 or 53 and transmitted to the communication terminal 21. However, the present invention is not limited to this. The connection data sets may be read out from the storage section 43 or 53 sequentially and the communication terminals 21 connected to the server may receive them in order of connection. One or more of the connection pattern data sets can be read out from the storage section 43 or 53 and transmitted to the communication terminal 21.

Moreover, in the above-noted first embodiment, a plurality of connection pattern data sets have been produced based on the connection unit time of 15 seconds and the predetermined natural number of 3. However, the present invention is not limited to this. If the connection pattern data created include a plurality of connection times, there are many ways to produce the connection pattern data: The connection unit time and the natural number can be other numbers.

Furthermore, in the above-noted first embodiment, the connection patter data include a combination of various connection times. However, the present invention is not limited to this. The connection pattern data set may include only one connection time. In this case, the communication terminal 21 will acquire a new connection pattern data set each time it accesses the delivery server 23. This can present the same effect as the above-noted embodiment.

Furthermore, in the above-noted first embodiment, the connection pattern data sets have been previously stored in the storage sections 43 and 53. However, the present invention is not limited to this. Instead, the storage sections 43 and 53 may store only a plurality of connection times and generates, when having received a pattern data demand signal, a connection pattern data set. Alternatively, the servers 22 and 23 may produce a plurality of connection times in accordance with the server load SL and network load NL observed.

Furthermore, in the above-noted first embodiment, the terminals 21 of the same type are connected to the management server 22 and the delivery server 23. However, the present invention is not limited to this. The terminals 21 of different types (or different versions) may be connected to the management server 22 and the delivery server 23. In this case, the delivery server 23 or the management server 22 is designed to recognize and manage the available space of the temporary storage section 37 of the communication terminals 21.

Accordingly, the server can prevent the temporary storage section 37 from overflowing. When a new communication terminal 21 is connected to the server, the server may confirm the available space of the temporary storage section 37 of the new terminal 21 and select a connection pattern data set appropriate for the terminal 21.

Furthermore, in the above-noted first embodiment, the terminal 21 first acquires the connection pattern data set from the management server 22. After that, the terminal 21 acquires a new connection pattern data set from the delivery server 23. However, the present invention is not limited to this. The terminal 21 may acquire the connection pattern data sets only from the delivery server 23 while receiving the address of the delivery server 23 from the management server 22. Alternatively, the terminal 21 may acquire the connection pattern data sets only from the management server 22. In these cases, the connection pattern data sets may be stored in the management server 22 or the delivery server 23. Accordingly, the configuration of the communication system 20 can be simplified.

Furthermore, in the above-noted first embodiment, a tag is attached to the portion of the emergency information of the presentation data and the communication terminal 21 first and foremost displays the emergency information on the display section 36. However, the present invention is not limited to this. The terminal 21 may receive from the management server 22 an emergency notification signal that indicates the fact that the presentation data set includes the emergency information and where the emergency information exists in the presentation data set. In addition, taking into consideration the fact that the emergency information is frequently delivered when a disaster occurs, the communication terminal 21, the management server 22 or the delivery server 23 may have previously stored an emergency connection pattern data that only includes a short period of connection time (for example 15 seconds). When the presentation data includes the emergency information, the communication terminals 21 may access the delivery server 23 in accordance with the emergency connection pattern data. Accordingly, the communication terminal 21 can swiftly update the presentation data stored in the temporary storage section 37 and therefore can present the emergency information to users as soon as possible.

Furthermore, in the above-noted first embodiment, there is one delivery server 23 connected to the communication terminals 21. However, the present invention is not limited to this. There may be a plurality of delivery servers 23. In this case, the control section 42 of the management server 22 has memorizes the addresses of the delivery servers 23 and offer to the communication terminal 21 one of the addresses of the delivery servers 23 whose server load is at the lowest level at that time when the communication terminal 21 demands the initial setting. This prevents the communication terminals 21 from accessing the same delivery server 23 at the same time, reducing the server load SL.

Furthermore, in the above-noted first embodiment, the communication terminal 21 disconnects the connection from the management server 22 after connecting to the delivery server 23 in accordance with the connection pattern data and acquiring the presentation data set from the delivery server 23. However, the present embodiment is not limited to this. The delivery server 23 may disconnect the connection from the communication terminal 21.

Furthermore, in the above-noted first embodiment, the presentation data sets are in the format of XML or streaming. However, the present invention is not limited to this. The presentation data may be in text format or the like if it can be displayed on the display section 36 of the communication terminal 21. Alternatively, the presentation data set may include image data, moving image data, audio data (which can be output from the output section 35 of the communication terminal 21) or the like.

Furthermore, in the above-noted first embodiment, the management server 22 starts a process of changing the connection pattern data when a user, or an operator, inputs a command to change them. However, the present invention is not limited to this. The management server 22 or the communication terminals 21 may start a process of changing the connection pattern data when a user, or an operator, inputs a command to change them. Alternatively, the control section 52 of the delivery server 23 may observe the server load SL (which changes according to the number of terminals 21 connected to the server 23) and the network load NL of the network 24 (which changes according to when and how many terminals 21 access the server 23) and, when the server load SL or the network load NL exceeds a predetermined threshold, change the connection pattern data.

(2) Second Embodiment

Figure 14:
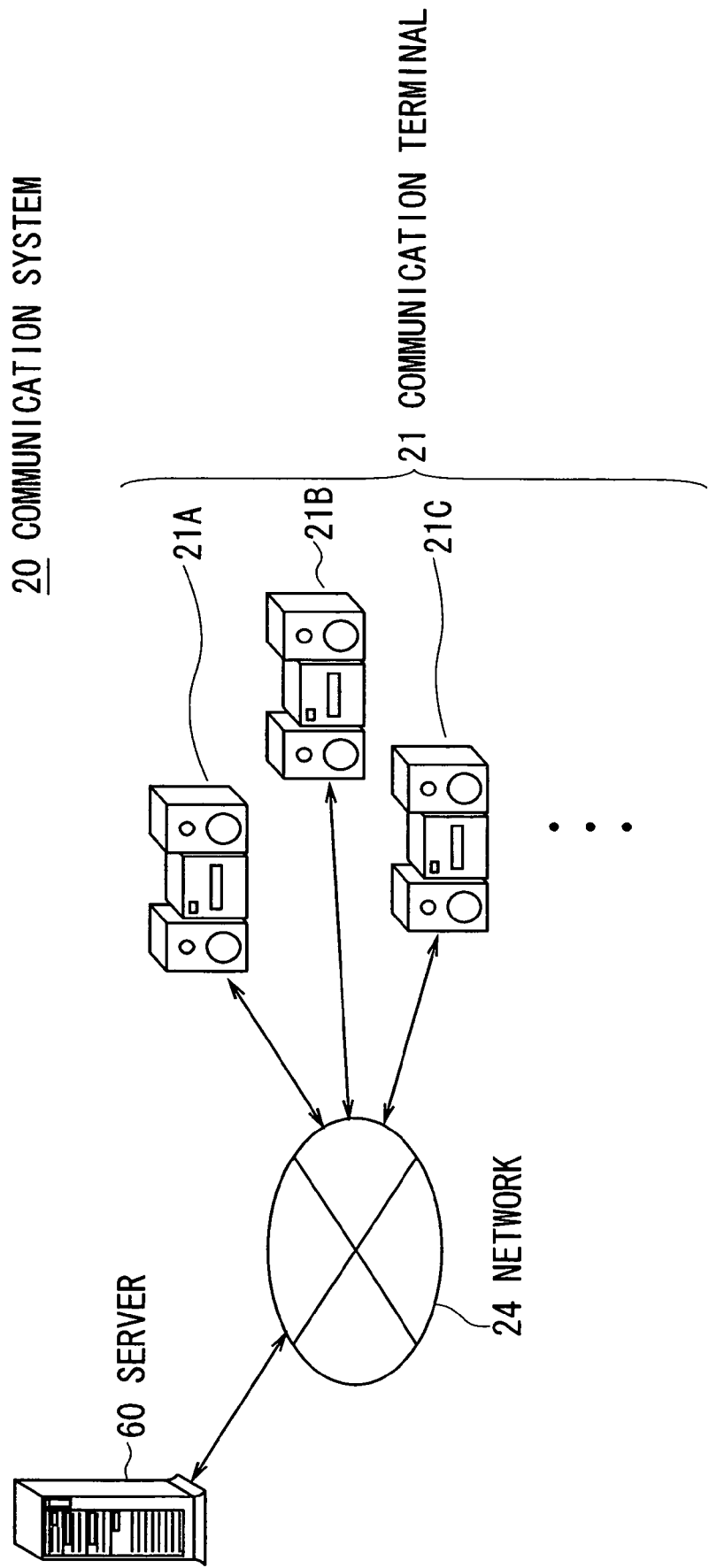
FIG. 14 is a schematic diagram illustrating a communication system according to a second embodiment of the present invention.

As shown in FIG. 14, in the second embodiment, the configuration of the communication terminals 21 are the same as that of the first embodiment. A server 60 of the second embodiment is equipped with the functions of both the management server 22 and the delivery server 23. In the second embodiment, when the communication terminal 21 accesses the server 60 at the timing that is the last in the list of the connection pattern data set, the terminal 21 transmits to the server 60 a used pattern notification signal that notifies the server 60 of the type of the currently-used connection pattern data set.

(2-1) Configuration of the Server of the Second Embodiment

Figure 15:
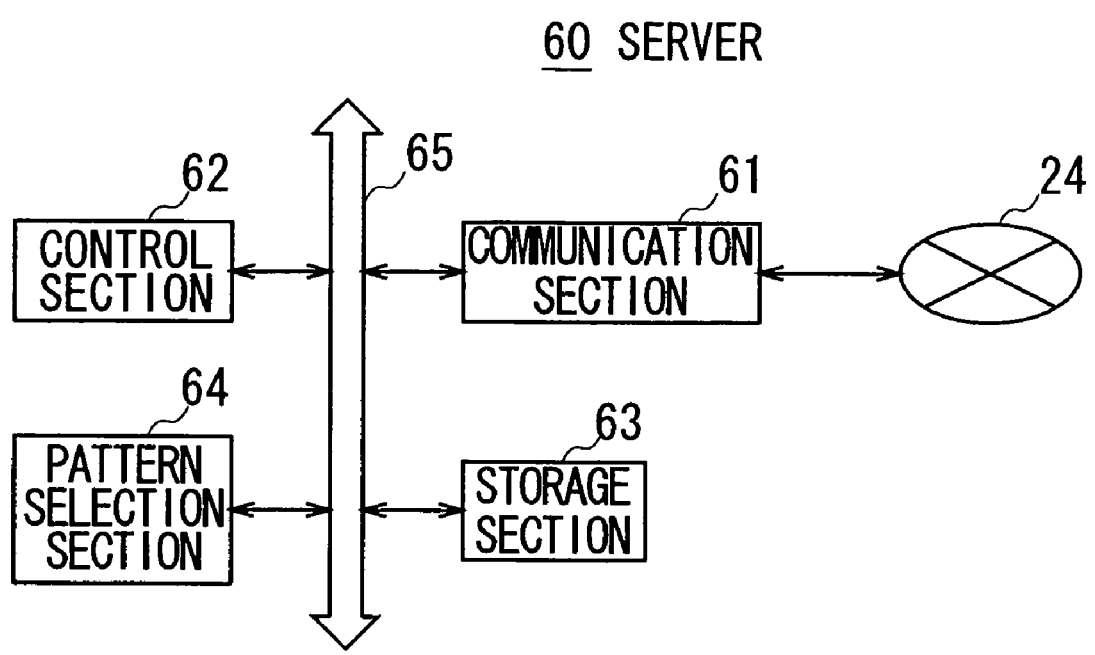
FIG. 15 is a block diagram illustrating the configuration of a server according to a second embodiment of the present invention.

FIG. 15 illustrates the hardware configuration of the server 60 using the functional circuit blocks. The server 60 includes a communication section 61 that communicates with the communication terminals 21 via the network 24. The server 60 also includes a control section 62 that reads out from a storage section 63 a program, which is then loaded onto a memory (not shown). The server 60 takes overall control of the server 60 via a bus 65 and performs various processes.

The storage section 63 of the server 60 has previously stored connection pattern data sets indicating the timings at which the communication terminals 21 will access the server 60. The storage section 63 also has stored presentation data in the format of XML or streaming, which is information to be displayed on the display section 36 of the communication terminal 21 regarding a new, hit song, recommended music, high-profile artists, news, weather information and the like. Each time the sever 60 acquires new information, the presentation data. stored in the storage section 63 are updated accordingly.

When being powered on by a user operating an operating section 31, the control section 30 of the communication terminal 21 starts operating and then checks if it has been connected to the network 24 via the communication section 33. When it confirms that the communication terminal 21 is connected to the network 24, the control section 30 accesses, through the communication section 33, the server 60 via the network 24 in accordance with the address pre-stored in the storage section 32 or an internal memory (not shown). The control section 30 subsequently transmits to the server 60 a first pattern data demand signal that demands a connection pattern data set.

The control section 62 of the server 60 receives, through the communication section 61, the first pattern data demand signal from the terminals 21 via the network 24 and controls, in accordance with the received first pattern data demand signal, a pattern selection section 64 to randomly select one of the connection pattern data sets from the storage section 63 and then transmits the selected data set to the terminal 21.

The communication terminal 21 receives the connection pattern data set from the server 60 and then accesses the server 60 at the timing indicated in the connection pattern data. The communication terminal 21 subsequently transmits, through the communication section 33, to the server 60 a presentation data set demand signal that demands an amount of presentation data it can receive during the period of time from when it accessed the server 60 until it will access the server 60 again.

The control section 62 of the server 60 receives, through the communication section 61, the presentation data set demand signal from the terminals 21 via the network 24 and reads out that amount of presentation data from the storage section 63 in accordance with the received presentation data set demand signal and then transmits it to the communication terminal 21.

In that manner, in the communication system 20 of the second embodiment, the communication terminal 21 can acquire the presentation data sets from the server 60 in accordance with the connection pattern data sets.

The control section 30 of the terminal 21 receives, through the communication section 33, the presentation data set from the server 60 and then temporarily stores it in the temporary storage section 37. The control section 30 subsequently reads out the presentation data set from the temporary storage section 37 and displays information on the display section 36 in accordance with the presentation data set. When having received all the presentation data sets from the server 60, the control section 30 controls the communication section 33 to disconnect the connection with the server 60. The control section 30 will repeat the above process of acquiring the presentation data sets from the server 60 until it reaches the last timing in the list of the connection pattern data set.

(2-2) Data Acquisition Process

Figure 16:
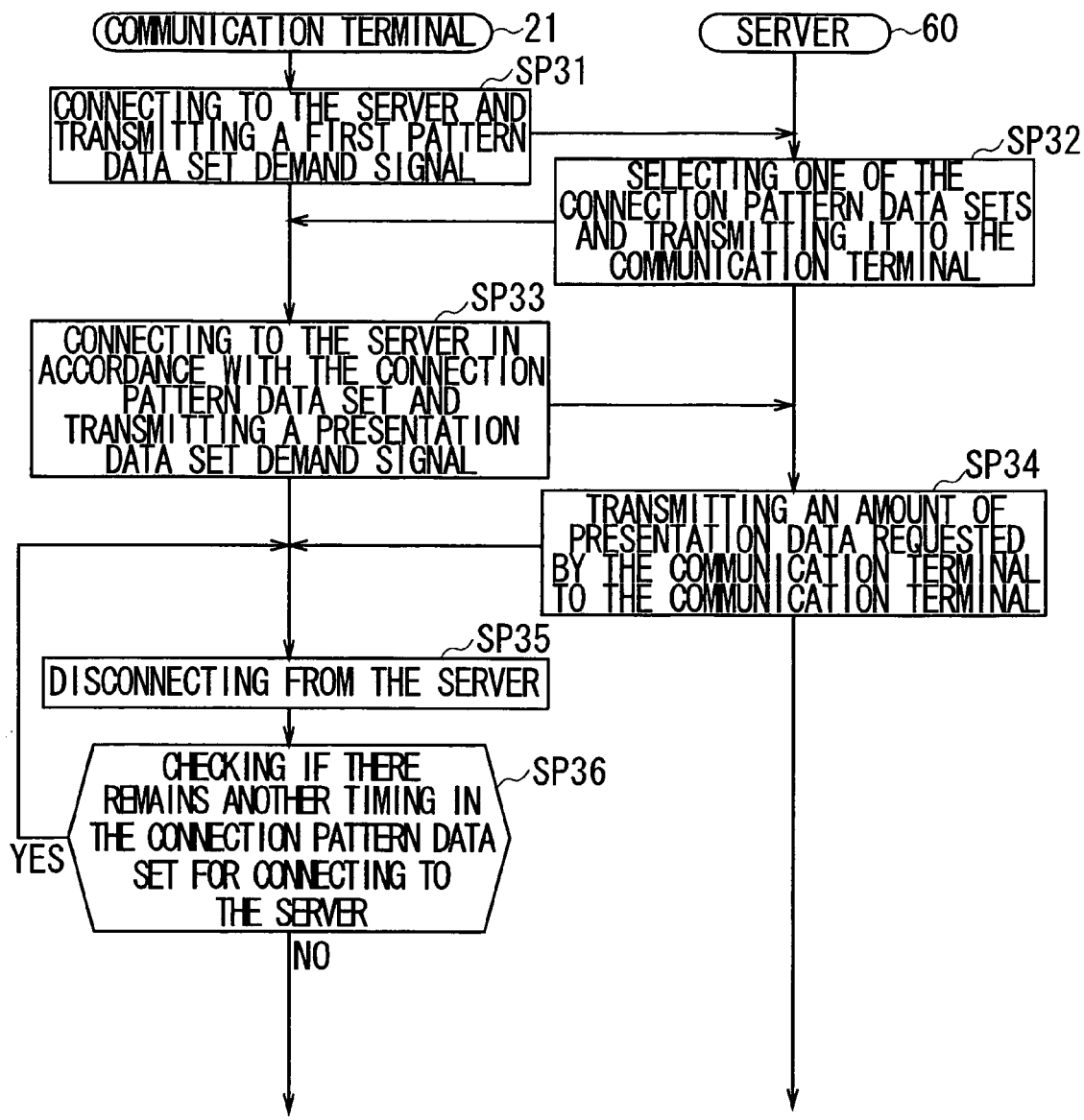
FIG. 16 is a sequence chart illustrating a data acquisition process according to a second embodiment of the present invention.

FIG. 16 is a sequence chart illustrating a data acquisition process in which the communication terminal 21 acquires the presentation data from the server 60 in the communication system 20 of the second embodiment. When being powered on by a user operating the operation section 31, the control section 30 of the communication terminal 21 starts operating and proceeds to step SP31. At step SP31, the control section 30 establishes the connection with the server 60 and transmits a first pattern data demand signal to the server 60 and then proceeds to step SP32.

At step SP32, the control section 62 of the server 60 randomly selects one of the connection pattern data sets from the storage section 63 in accordance with the first pattern data demand signal and transmits it to the terminal 21 and then proceeds to step SP33.

At step SP33, the control section 30 of the communication terminal 21 accesses the server 60 at the timing indicated in the connection pattern data and transmits to the server 60 a presentation data set demand signal and then proceeds to step SP34.

At step SP34, the control section 62 of the server 60 reads out from the storage section 63 an amount of presentation data specified by the presentation data set demand signal and transmits it to the terminal 21 and then proceeds to step SP35.

At step SP35, the control section 30 of the communication terminal 21 receives from the server 60 the presentation data set, which is then temporarily stored in the temporary storage section 37. The control section 30 reads out from the temporary storage section 37 the presentation data set and supplies it to the display section 36, which then displays information based on the presentation data set. When having received all the presentation data sets from the server 60, the control section 30 is disconnected from the server 60 and then proceeds to step SP36.

At step SP36, the control section 30 of the communication terminal 21 checks if there are the timings still left in the connection pattern data set. Until it has gotten the negative result at step SP36, the control section 30 repeats the process of step SP33 to SP36.

In that manner, the communication terminal 21 acquires the presentation data from the server 60 in accordance with the connection pattern data.

(2-3) Re-Acquisition of the Connection Pattern Data

When the control section 30 of the terminal 21 accesses the server 60 at the timing that is the last in the list of the connection pattern data acquired from the server 60, the control section 30 transmits, through the communication section 33, to the server 60 a second pattern data demand signal that demands a new connection pattern data set, instead of the presentation data set demand signal. At the same time, the control section 30 transmits to the server 60 a used pattern notification signal to notify the server 60 of the type of the currently-used connection pattern data.

The control section 62 of the server 60 receives, through the communication section 61, the second pattern data demand signal and the used pattern notification signal from the terminal 21 via the network 24 and controls a pattern selection section 64 to randomly select one of the connection pattern data sets, other than the one indicated in the used pattern notification signal, from the storage section 63 and then transmits it to the communication terminal 21.

The control section 30 of the communication terminal 21 receives, through the communication section 61, the connection pattern data set from the server 60 and generates a presentation data set demand signal in accordance with the connection pattern data set and then transmits it to the server 60.

In that manner, in the second embodiment, the control section 30 of the communication terminal 21 will receive a new connection pattern data set, which is different from the previous one, from the server 60. This prevents the following case: The communication terminal 21 repeatedly acquires the connection pattern data sets including long connection times, which delays the process of acquiring the presentation data sets. Accordingly, the control section 30 smoothly updates the information displayed on the display section.

(2-4) Pattern Re-Acquisition Process

Figure 17:
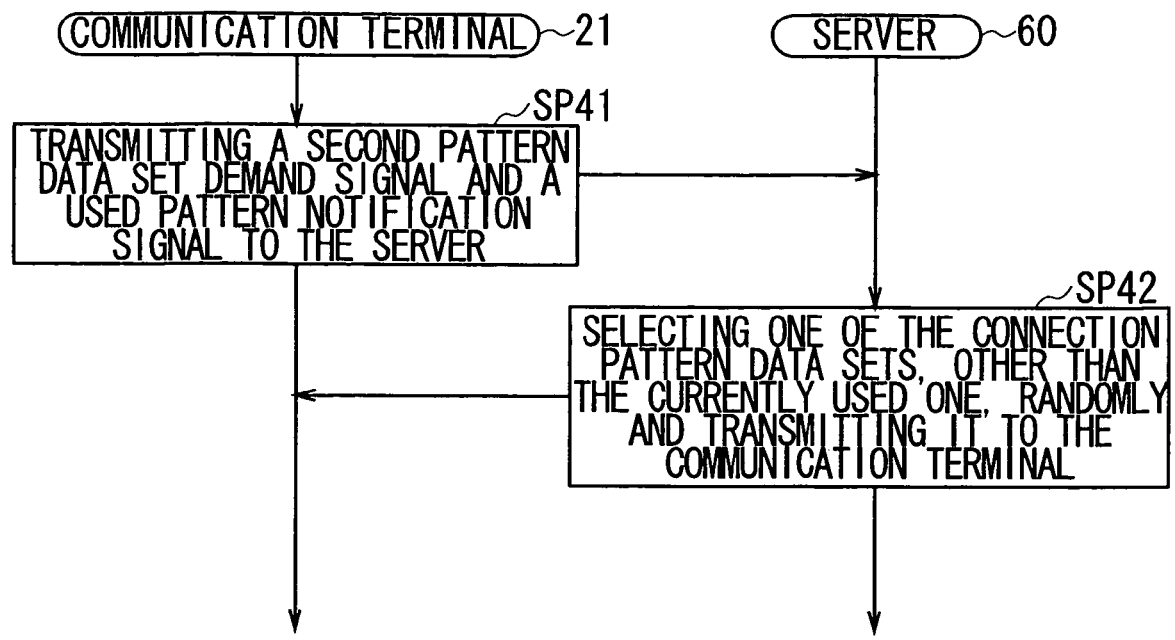
FIG. 17 is a sequence chart illustrating a pattern re-acquisition process according to a second embodiment of the present invention.

FIG. 17 is a sequence chart illustrating a pattern re-acquisition process in which the communication terminal 21 re-acquires the connection pattern data from the server 60. When the control section 30 of the terminal 21 accesses the server 60 at the timing that is the last in the list of the connection pattern data, the control section 30 at step SP41 transmits a pattern data demand signal and a used pattern notification signal to the server 60 and then proceeds to step SP42.

At step SP42, the control section 62 of the server 60 receives, through the communication section 61, the pattern data demand signal and the used pattern notification signal from the terminal 21 and randomly selects one of the connection pattern data sets, other than the one indicated in the used pattern notification signal, from the storage section 63 and then transmits it to the terminal 21.

In that manner, the control section 30 of the terminal 21 re-acquires the connection pattern data set from the server 60.

(2-5) Operation and Effect of the Second Embodiment

The communication terminal 21 accesses the server 60 which is equipped with the functions of both the management server 22 and the delivery server 23. The terminal 21 acquires the connection pattern data, the presentation data from the server 60. In addition, the terminal 21 re-acquires the connection pattern data from the server 60.

Accordingly, the configuration of the communication system 20 of the second embodiment is simpler than that of the first embodiment. Therefore, the processes of the communication system 20 are simple.

(2-6) Other Embodiments of the Second Embodiment

In the above-noted second embodiment, the communication terminal 21 transmits to the server 60 a used pattern notification signal in order to receive a new connection pattern data set, which is different the previous one. However, the present invention is not limited to this. The server 60 may memorize the history of the connection pattern data sets transmitted to the terminals 21 in order to make sure the terminal 21 will receive a new connection pattern data set, which is different the previously-used one. In addition, all the terminals 21 may manage all the connection pattern data sets transmitted to the terminals 21: This makes it possible that each terminal 21 receives a different connection pattern data, which can reduce the server load SL and the network load NL.

(3) Third Embodiment

(3-1) Brief Overview of the Third Embodiment

Figure 18:
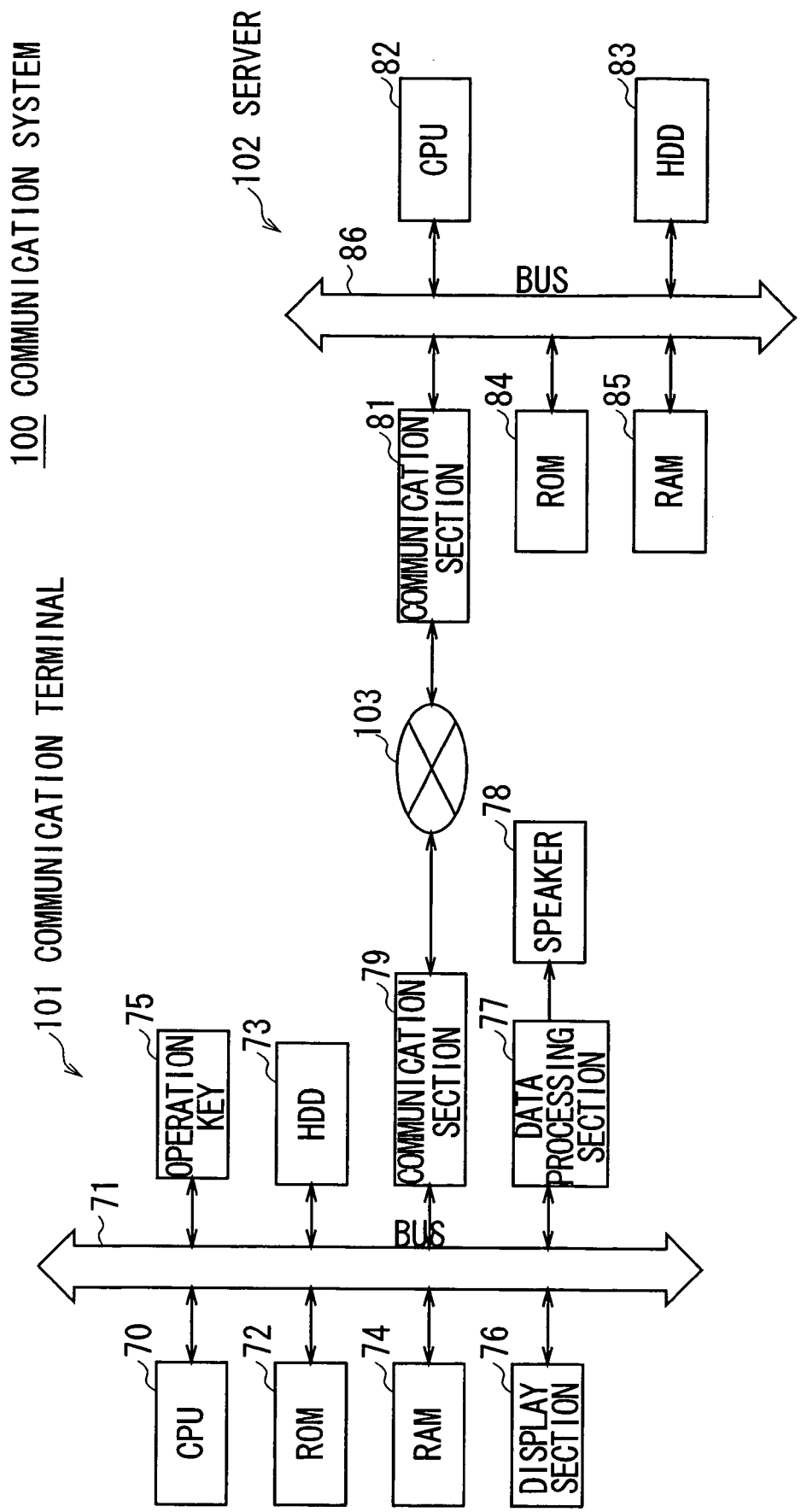
FIG. 18 is a block diagram illustrating the configuration of a communication system according to a third embodiment of the present invention.

FIG. 18 illustrates a communication system 100 according to the third embodiment. The communication system 100 includes a plurality of communication terminals 101 of the same type, a server 102 and a network 103 (such as the Internet) that connects the terminals 101 and the server 102.

(3-2) Communication Terminal of the Third Embodiment

The communication terminal 101 includes a central processing unit (CPU) 70 that is connected to other hardware components via a bus 71. The CPU 70 reads out from a Read Only Memory (ROM) or hard disk drive 73 various programs such as a data recording program, which are then loaded onto a Random Access Memory (RAM) 74. In this manner, the CPU 70 executes those programs to take overall control of the terminal 101 and perform various processes.

When an operation command that orders to record music data from a medium (such as Compact Disc (CD)) is input through an operation key 75 on the surface of the communication terminal 101, the CPU 70 reads out the music data from a medium inserted into a drive unit of the terminal 101 (not shown) and records it on the hard disk drive 73. When an operation command that demands a certain music data set is input through the operation key 75, the CPU 70 accesses, through a communication section 79, the server 102 via the network 103 and tries to download it from the server 102. When having received the music data set from the server 102 through the communication section 79, the CPU 70 stores it in the hard disk drive 73. In this manner, the CPU 70 can store various music data sets in the hard disk drive 73.

When an operation command that orders to play back a certain music data set from the hard disk drive 73 is input through the operation key 75, the CPU 70 reads out from the hard disk drive 73 the music data set. The CPU 70 subsequently controls a data processing section 77 to perform a predetermined playback process to the music data set, which is then output a speaker 78. When an operation command that orders to playback a certain music data set from a medium is input from the operation key 75, the central processing unit 70 reads out the music data set from the medium stored in the terminal 101 and transmits it via the data processing section 77 to the speaker 78, which then outputs the sound of the music data set.

The CPU 70 also generates display data indicating the result of various processes (such as the acquisition, recording or playback of music data) and transmits it to the display section 76 including a display control section and a display. Accordingly, the CPU 70 can display various screens, regarding the acquisition, recording or playback of music data, on the display section 76.

By the way, in the communication terminal 101, the CPU 70 performs various processes and controls hardware components in accordance with the programs stored in the ROM 72 or the hard disk drive 73. Accordingly, the communication terminal 101 can offer the same function as the communication terminal 21 of the first embodiment does. by executing an appropriate program: The CPU 70 will serve as the above control section 30 and data processing section 34 (FIG. 3).

In addition, the operation key 75 of the communication terminal 101 serves as the above operation section 31 (FIG. 3). The CPU 70 and the hard disk drive 73 may serve as the above storage section 32 (FIG. 3). Moreover, the CPU 70 and the communication section 79 may serve as the above communication section 33 (FIG. 3). Furthermore, the CPU 70 and the display section 71 may serve as the above display section 36 (FIG. 3). The ROM 72 and the RAM 74 may serve as the above temporary storage section 37 (FIG. 3). The speaker 78 may serve as the above output section 35 (FIG. 3).

Accordingly, by executing an appropriate program from the ROM 72 or the hard disk drive 73, the communication terminal 101 offers the same functions as the communication terminal 21 does.

(3-3) Server of the Third Embodiment

The server 102 of the communication system 100 includes a communication section 81 that can be connected to the terminals 101 via the network 103. The server 102 also includes a central processing unit (CPU) 82 that reads out from a hard disk drive 83 or a ROM 84 the programs, which are then loaded onto a RAM 85. In this manner, the CPU 82 takes overall control of the server 102 via a bus 86 and performs various processes.

The hard disk drive 83 of the server 102 has previously stored a connection pattern data set indicating the timings at which the communication terminals 101 will access the server 102. The hard disk drive 83 also has stored presentation data in the format of XML or streaming, which is information to be displayed on the display section 76 of the communication terminal 101 regarding a new, hit song, recommended music, high-profile artists, news, weather information and the like. Each time the sever 102 acquires new information, the presentation data stored in the hard disk drive 83 are updated accordingly.

By the way, in the server 102, the CPU 82 performs various processes and controls hardware components in accordance with the programs stored in the ROM 84 or the hard disk drive 83. Accordingly, the server 102 can offer the same function as the management server 22 and delivery server 23 of the first embodiment do by executing an appropriate program: The CPU 82 will serve as the above control section 42 and pattern selection section 44 (FIG. 4) and the control section 52 and pattern selection section 54 (FIG. 5).

In addition, the CPU 82 and the hard disk drive 83 may serve as the above storage section 43 (FIG. 4) and the storage section 53 (FIG. 5). Moreover, the CPU 82 and the communication section 81 may serve as the communication section 41 (FIG. 4) and the communication section 51 (FIG. 5).

Accordingly, by executing an appropriate program from the ROM 84 or the hard disk drive 83, the server 102 offers the same functions as the management server 22 and the delivery server 23 do.

(3-4) Operation and Effect of the Third Embodiment

In the communication system 100 of the third embodiment, the communication terminal 101 offers the same function as the communication terminal 21 does while the server 102 offers the same functions as the management server 22 and the delivery server 23 do. Accordingly, the communication system 100 of the third embodiment can present the same effect as the communication system 20 of the first embodiment does.

(3-5) Other Embodiment of the Third Embodiment

In the third embodiment, the above method is applied to the communication system 100 (FIG. 18) including the communication terminals 101, the server 102 and the network 103. However, the present invention is not limited to this. The above method can be applied to other communication systems, such as the one including a portable audio player and a personal computer, which wirelessly communicate with each other.

Moreover, in the above-noted third embodiment, a first communication section that connects to and communicates with a plurality of communication terminals is the communication section 81 (FIG. 18). However, the present invention is not limited to this. The first communication section can be other communication sections, such as the one that wirelessly communicates.

Furthermore, in the above-noted third embodiment, a storage section that stores a plurality of connection patterns each of which indicates the timings at which a communication terminal will access a server is the hard disk 83 (FIG. 18). However, the present invention is not limited to this. That storage section can be other storage sections, such as non-volatile flash memories, optical storage discs stored in a drive unit (not shown) or external storage media such as hard disks or flash memories.

Furthermore, in the above-noted third embodiment, a pattern selection section that selects one of the connection patterns from the storage section is the CPU 82 (FIG. 18). However, the present invention is not limited to this. The pattern selection section can be other components, such as a hardware component that selects one of the connection patterns from the storage section.

Furthermore, in the above-noted third embodiment, a first control section that controls a first communication section to transmit a connection pattern selected by the pattern selection section to a communication terminal the first communication section communicates with is the CPU 82 (FIG. 18). However, the present invention is not limited to this. The first control section can be other hardware or software components.

Furthermore, in the above-noted third embodiment, a second communication section that communicates with a server is the communication section 79 (FIG. 18). However, the present invention is not limited to this. The second communication section can be other components, such as the one that wirelessly communicates.

Furthermore, in the above-noted third embodiment, a second control section that controls the second communication section to communicate with the server at the timing indicated in the connection pattern received by the second communication section is the CPU 70 (FIG. 18). However, the present invention is not limited to this. The second control section can be other hardware or software components.

The above method can be applied to a communication system in which a server and a plurality of communication terminals communicate with each other.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
 a plurality of communication terminals; and
 a server that can connect to and communicate with the plurality of communication terminals, wherein the server includes:
  a first communication section to connect to and communicates with the plurality of communication terminals;
  a storage section to store a plurality of connection patterns, each connection pattern indicating timings at which a communication terminal operating according to the connection pattern will access the server, each of the timings being a multiple of a unit time by an integer less than or equal to a threshold value;
  a pattern selection section to select one of the connection patterns from the storage section; and
  a first control section to control the first communication section to transmit the connection pattern selected by the pattern selection section to a communication terminal to which the first communication section connects;
 wherein each communication terminal includes:
  a second communication section to connect to and communicates with the server; and
  a second control section to control the second communication section to connect to the server at timing indicated in the connection pattern received by the second communication section; and
 wherein:
  the first control section of the server controls, when connected to a first communication terminal through the first communication section at a particular timing indicated in the connection pattern, the first communication section to transmit an amount of communication data determined based on the integer of the particular timing by multiplying the integer by a unit data amount to yield the amount of the communication data;

the second communication section of the first communication terminal receives the communication data from the server;

the first control section of the server adds, when the communication data includes emergency information, a tag to a portion of the communication data that includes the emergency information;

the second control section of each of the plurality of communication terminal gives, when the communication data transmitted from the server includes the tag, priority to the portion attached to the tag;

the storage section of the server stores a plurality of emergency patterns each of which indicates timings at which the communication terminals will access the server in case of emergency, the intervals of the timings of the emergency patterns being shorter than that of the connection pattern;

the pattern selection section selects, when being connected to a communication terminal through the first communication section in case of emergency, one of the emergency patterns from the storage section; and the first control section controls the first communication section to transmit the emergency pattern selected by the pattern selection section to the communication terminal to which the first communication section connects.

2. The communication system according to claim 1, wherein:

each communication terminal includes a temporary storage section to temporarily store the communication data the second communication section receives from the server; and the first control section of the server selects, in accordance with an amount of the communication data the temporary storage section of the first communication terminal can temporarily store, one of the connection patterns that includes the latest timing from the storage section and sets the selected connection pattern in the first communication terminal.

3. The communication system according to claim 1, wherein the first control section of the server controls the first communication section to disconnect from the first communication terminal after completing the transmission of the communication data to the first communication terminal.

4. The communication system according to claim 1, wherein the second control section of each of the plurality of communication terminal controls the second communication section to disconnect from the server after having received the communication data from the server.

5. The communication system according to claim 1, wherein the pattern selection section of the server randomly selects, when being connected to the communication terminal through the first communication section, one of the connection patterns from the storage section.

6. The communication system according to claim 1, wherein the pattern selection section of the server selects, when being connected to the communication terminal through the first communication section, a different connection pattern than the connection pattern according to which the communication terminal the server is currently connected to is operating.

7. The communication system of claim 1, wherein the timings of each connection pattern are a set of one or more timings at which a communication terminal will access the server, and wherein each communication terminal is adapted to, following accessing the server at a last timing of the set of one or more timings, request a new connection pattern from the server.

8. A server for connecting to and communicating with a plurality of communication terminals, comprising:

at least one hardware processor;

a communication section to connect to and communicates with the plurality of communication terminals;

a storage section to store a plurality of connection patterns, each connection pattern indicating timings at which a communication terminal operating according to the connection pattern will access the server, each of the timings being a multiple of a unit time by an integer less than or equal to a threshold value;

a pattern selection section to select one of the connection patterns from the storage section; and a control section to control the communication section to transmit the connection pattern selected by the pattern selection section to a communication terminal to which the communication section connects; and wherein the control section controls, when being connected to a first communication terminal through the communication section at a particular timing indicated in the connection pattern the first communication terminal holds, the communication section to transmit an amount of communication data determined based on the integer of the particular timing by multiplying the integer by a unit data amount to yield the amount of the communication data;

the control section adds, when the communication data includes emergency information, a tag to a portion of the communication data that includes the emergency information;

the storage section stores a plurality of emergency patterns each of which indicates timings at which the plurality of communication terminals will access the server in case of emergency, the intervals of the timings of the emergency patterns being shorter than that of the connection pattern;

the pattern selection section selects, when being connected to a communication terminal through the communication section in case of emergency, one of the emergency patterns from the storage section; and the control section controls the communication section to transmit the emergency pattern selected by the pattern selection section to the communication terminal to which the communication section connects.

9. The server according to claim 8, wherein the control section selects, in accordance with an amount of the communication data a temporary storage section of the first communication terminal can temporarily store, one of the connection patterns that includes the latest timing from the storage section and sets the selected connection pattern in the first communication terminal.

10. The server according to claim 8, wherein the control section controls the communication section to disconnect from the first communication terminal after completing the transmission of the communication data to the first communication terminal.

11. The server according to claim 8, wherein
the pattern selection section randomly selects, when being connected to a communication terminal through the communication section, one of the connection patterns from the storage section.

12. The server according to claim 8, wherein
the pattern selection section selects, when being connected to the communication terminal through the communication section, a different connection pattern than the connection pattern according to which the communication terminal the server is currently connected to is operating.

13. A communication terminal for connecting to and communicating with a server, comprising:
at least one hardware processor;
a communication section to connect to and communicate with the server; and
a control section to control the communication section to connect to the server according to timings indicated in the connection pattern received by the communication section, each of the timings being a multiple of a unit time by an integer less than or equal to a threshold value,
wherein, when the communication section is communicating with the server at a particular timing indicated in the connection pattern, the communication section receives an amount of communication data from the server, the amount of communication data being determined based on the integer of the particular timing by multiplying the integer by a unit data amount,
when a portion of the communication data includes a tag including emergency information, the communication section gives priority to the portion of the communication data that includes the tag, and
wherein, upon receiving an emergency pattern from the server indicating timings at which to access the server in case of emergency, intervals of the timings of the emergency patterns being shorter than that of the connection patterns, the control section controls the communication section to connect to the server according to timings indicated in the emergency pattern.

14. The communication terminal according to claim 13, wherein
the communication section receives from the server communication data whose amount is determined based on the timing indicated in the connection pattern.

15. The communication terminal according to claim 14, wherein
the control section controls the communication section to disconnect from the server after having received the communication data from the server.

16. The communication terminal according to claim 15, wherein
the control section gives, when the communication data transmitted from the server includes a tag, priority to a portion of the communication data that is attached to the tag.

17. The communication terminal of claim 13, wherein the timings of each connection pattern are a set of one or more timings at which a communication terminal will access the server, and
wherein each communication terminal is adapted to, following accessing the server at a last timing of the set of one or more timings, request a new connection pattern from the server.

18. A communication method for a plurality of communication terminals and a server that connects to and communicates with the communication terminals, comprising:
storing in a storage section of the server a plurality of connection patterns, each connection pattern indicating timings at which a communication terminal operating according to the connection pattern will access the server, each of the timings being a multiple of a unit time by an integer less than or equal to a threshold value, at least one of the connection patterns being an emergency pattern indicating timings at which a communication terminal will access the server in case of emergency, intervals of the emergency patterns being shorter than that of non-emergency connection patterns;
selecting, when the server is connected to the communication terminal, one of the connection patterns from the storage section, wherein the selecting comprises, in case of emergency, selecting an emergency pattern;
transmitting the selected connection pattern to the connected communication terminal;
connecting to the server at timing indicated in the connection pattern transmitted from the server;
when connected at a particular timing indicated in the connection pattern, communicating between the server and the communication terminal an amount of communication data determined based on the integer of the particular timing by multiplying the integer by a unit data amount to yield the amount of the communication data;
when the communication data includes emergency information, adding, at the server, a tag to a portion of the communication data that includes the emergency information and giving, at the communication terminal, priority to the portion of the communication data that includes the tag.

* * * * *